US012618789B2

(12) United States Patent
Katsuyama

(10) Patent No.: US 12,618,789 B2
(45) Date of Patent: May 5, 2026

(54) INFRARED THERMAL IMAGE ANALYSIS DEVICE, INFRARED THERMAL IMAGE ANALYSIS METHOD, AND PROGRAM

(71) Applicant: FUJIFILM Corporation, Tokyo (JP)

(72) Inventor: Kimito Katsuyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 344 days.

(21) Appl. No.: 18/308,731

(22) Filed: Apr. 28, 2023

(65) Prior Publication Data

US 2023/0258588 A1    Aug. 17, 2023

Related U.S. Application Data

(63) Continuation of application No. PCT/JP2021/036558, filed on Oct. 4, 2021.

(30) Foreign Application Priority Data

Oct. 30, 2020    (JP) ................................. 2020-182464
Jan. 14, 2021    (JP) ................................. 2021-004181

(51) Int. Cl.
*G01N 25/72*       (2006.01)
*G01J 5/48*        (2022.01)
*G06T 7/11*        (2017.01)

(52) U.S. Cl.
CPC ................ *G01N 25/72* (2013.01); *G01J 5/48* (2013.01); *G06T 7/11* (2017.01); *G06T 2207/10048* (2013.01)

(58) Field of Classification Search
CPC ......... G01N 25/72; G01N 33/383; G01J 5/48; G01J 5/0859; G01J 5/0066; G01J 5/025;
(Continued)

(56) References Cited

U.S. PATENT DOCUMENTS

| | | | |
|---|---|---|---|
| 5,719,395 A | 2/1998 | Lesniak | |
| 7,208,733 B2 * | 4/2007 | Mian ..................... | G01J 5/0801 |
| | | | 250/330 |

(Continued)

FOREIGN PATENT DOCUMENTS

| | | |
|---|---|---|
| CN | 108490029 A | 9/2018 |
| CN | 109483107 A | 3/2019 |

(Continued)

OTHER PUBLICATIONS

Computer translation of JP 2013-224849 downloaded from the JPO website (Year: 2025).*

(Continued)

*Primary Examiner* — Randy W Gibson
(74) *Attorney, Agent, or Firm* — Studebaker Brackett PLLC

(57) ABSTRACT

Provided are an infrared image analysis device, an infrared image analysis method, and a program capable of correctly reducing a temperature gradient. An infrared thermal image analysis device (10) includes a processor. The processor acquires a first infrared thermal image of a structure surface, which is obtained by capturing a structure (36) to be inspected, acquires region information (105) that distinguishes a region of the structure surface corresponding to the first infrared thermal image for at least one region, estimates a temperature gradient in the at least one region based on the region information (105) and a second infrared thermal image, and reduces an influence of the temperature gradient from the first infrared thermal image.

21 Claims, 14 Drawing Sheets

(58) Field of Classification Search
CPC ............... G01J 2207/0048; G06T 7/11; G06T
2207/0048
See application file for complete search history.

(56) References Cited

U.S. PATENT DOCUMENTS

| | | | | |
|---|---|---|---|---|
| 7,994,480 B2* | 8/2011 | Johnson | ................ | G01J 5/0265 |
| | | | | 250/370.08 |
| 8,466,422 B2* | 6/2013 | Johnson | .................. | G01J 5/025 |
| | | | | 250/370.08 |
| 11,650,112 B1* | 5/2023 | Qing | ........................ | G01L 1/248 |
| | | | | 73/800 |
| 2002/0031265 A1* | 3/2002 | Higaki | ...................... | G06T 7/12 |
| | | | | 382/199 |
| 2003/0021462 A1* | 1/2003 | Sakai | ...................... | G06T 7/001 |
| | | | | 382/145 |
| 2006/0222237 A1* | 10/2006 | Du | ......................... | G01N 25/72 |
| | | | | 382/152 |
| 2006/0249679 A1* | 11/2006 | Johnson | .................. | G01J 5/025 |
| | | | | 250/332 |
| 2008/0099678 A1* | 5/2008 | Johnson | .................... | G01J 5/02 |
| | | | | 250/332 |
| 2010/0260374 A1 | 10/2010 | Akashi et al. | | |
| 2011/0062339 A1* | 3/2011 | Ruhge | .................... | G01N 29/34 |
| | | | | 250/340 |
| 2011/0123093 A1* | 5/2011 | Alloo | ...................... | G01N 25/72 |
| | | | | 382/149 |
| 2017/0103507 A1* | 4/2017 | Fuchs | .................. | H04N 23/661 |
| 2018/0059065 A1* | 3/2018 | Hull | .................... | G01N 29/2412 |
| 2019/0289227 A1* | 9/2019 | Hirosawa | ............... | H04N 23/23 |
| 2019/0371014 A1 | 12/2019 | Etoh | | |
| 2020/0184630 A1 | 6/2020 | Wang et al. | | |
| 2021/0272272 A1* | 9/2021 | Matsumoto | .......... | G06V 10/764 |
| 2023/0342907 A1* | 10/2023 | Katsuyama | ............ | G01N 25/72 |
| 2024/0177325 A1* | 5/2024 | Katsuyama | ............... | G06T 7/30 |
| 2025/0146964 A1* | 5/2025 | Porat | ................ | G01N 21/95684 |

FOREIGN PATENT DOCUMENTS

| | | | | | |
|---|---|---|---|---|---|
| EP | 2 357 466 A1 | | 8/2011 | | |
| JP | H05-307013 | * | 11/1993 | ............. | G01N 25/72 |
| JP | H05-307013 A | | 11/1993 | | |
| JP | H09-281065 A | | 10/1997 | | |
| JP | 2005-016991 A | | 1/2005 | | |
| JP | 2005-016995 A | | 1/2005 | | |
| JP | 2005-172683 A | | 6/2005 | | |
| JP | 2005-338359 A | | 12/2005 | | |
| JP | 2006-177869 A | | 7/2006 | | |
| JP | 2007-285778 A | | 11/2007 | | |
| JP | 2011-099687 A | | 5/2011 | | |
| JP | 2011-226936 A | | 11/2011 | | |
| JP | 5140892 B2 | | 2/2013 | | |
| JP | 2013-096741 A | | 5/2013 | | |
| JP | 2013-224849 A | | 10/2013 | | |
| JP | 5318728 B2 | | 10/2013 | | |
| JP | 2016-065809 A | | 4/2016 | | |
| JP | 2017-203761 A | | 11/2017 | | |
| WO | 2010/046967 A1 | | 4/2010 | | |
| WO | 2018/155267 A1 | | 8/2018 | | |

OTHER PUBLICATIONS

Computer translation of JP H05-307013 downloaded from the JPO website (Year: 2025).*
Computer translation of JP 2011-099687 A (Year: 2025).*
Computer translation of JP 2013-224849 A (Year: 2025).*
Computer translation of JP 2017-203761 A (Year: 2025).*
Computer translation of JP H05-307013-A (Year: 2026).*
International Search Report issued in PCT/JP2021/036558; mailed Dec. 14, 2021.
International Preliminary Report on Patentability (Chapter I) and Written Opinion of the International Searching Authority issued in PCT/JP2021/036558; issued May 2, 2023.
The extended European search report issued by the European Patent Office on Mar. 18, 2024, which corresponds to European Pateent Application No. 21885821.5-1001 and is related to U.S. Appl. No. 18/308,731.
"Notice of Reasons for Refusal" Office Action issued in JP 2022-558949; mailed by the Japanese Patent Office on Mar. 17, 2025.
Office Action issued in CN 202180073014.4; mailed by the State Intellectual Property Office of the People's Republic of China on Nov. 10, 2025.
International Search Report issued in PCT/JP2021/048467; mailed Mar. 22, 2022.
International Preliminary Report On Patentability (Chapter I) and Written Opinion of the International Searching Authority issued in PCT/JP2021/048467; issued Jul. 4, 2023.
The extended European search report issued by the European Patent Office on Jun. 10, 2024, which corresponds to European Patent Application No. 21 91 9738.1-1001.
A Notice of Allowance mailed by the United States Patent and Trademark Office on Jul. 15, 2025, which corresponds to U.S. Appl. No. 18/308,731 and is related to U.S. Appl. No. 18/308,731.
An Office Action; mailed by the China National Intellectual Property Administration of the People's Republic of China on Sep. 30, 2025, which corresponds to Chinese Patent Application No. 202180090589.7.
An Office Action; mailed by the China National Intellectual Property Administration of the People's Republic of China on Aug. 4, 2025, which corresponds to Chinese Patent Application No. 202180073014.4 and is related to U.S. Appl. No. 18/308,731.
An Office Action, "Notice of Reasons for Refusal," mailed by the Japanese Patent Office on Nov. 7, 2025, which corresponds to Japanese Patent Application No. 2022-575515; with English language translation.
Communication pursuant to Article 94(3) EPC issued by the European Patent Office on Feb. 2, 2026, which corresponds to European Patent Application No. 21919738.1-1001.

* cited by examiner

INFRARED THERMAL IMAGE ANALYSIS DEVICE, INFRARED THERMAL IMAGE ANALYSIS METHOD, AND PROGRAM

CROSS-REFERENCE TO RELATED APPLICATIONS

The present application is a Continuation of PCT International Application No. PCT/JP2021/036558 filed on Oct. 4, 2021 claiming priorities under 35 U.S.C. § 119(a) to Japanese Patent Application No. 2020-182464 filed on Oct. 30, 2020 and Japanese Patent Application No. 2021-004181 filed on Jan. 14, 2021. Each of the above applications is hereby expressly incorporated by reference, in its entirety, into the present application.

BACKGROUND OF THE INVENTION

1. Field of the Invention

The present invention relates to an infrared thermal image analysis device, an infrared thermal image analysis method, and a program.

2. Description of the Related Art

There is known a technique of discriminating, by using an infrared thermal image acquired in a case where a structure such as concrete is imaged with an infrared camera, between a damaged part, such as a floating or a crack, included in the structure and a sound part. In a case where the structure has the damaged part, a temperature difference occurs between a surface temperature of the damaged part and a surface temperature of the sound part. Therefore, in a case where a portion having a temperature different from that of the surroundings is locally present in the infrared thermal image, the damaged part is discriminated to be present inside the portion.

On the other hand, an amount of heat received or an amount of heat dissipated on a structure surface is partially different depending on a structure shape, an environment around the structure, or the like, and thus a temperature gradient may be generated on the structure surface. In a case where such a temperature gradient is present on the structure surface, it becomes difficult to discriminate between the sound part and the damaged part. The partial difference in the amount of heat received or the amount of heat dissipated on the structure surface may also occur due to partial differences in color or roughness, unevenness, and thermal conductivity or emissivity of the structure surface, in addition to the structure shape or the environment around the structure.

To solve this problem, JP5140892B discloses that an average temperature distribution image obtained by moving and averaging an infrared thermal image with a predetermined number of pixels is created, a temperature difference between the same pixel of the infrared thermal image and the average temperature distribution image is calculated to create a temperature difference image, and the temperature difference image is displayed.

SUMMARY OF THE INVENTION

By the way, in a case where a structure has a plurality of surfaces having different inclinations, an average temperature and an orientation and inclination of a temperature gradient on each surface are different due to the influence of solar radiation or the like on the surface of the structure. In a case where the infrared thermal image is smoothed and the difference is taken without distinguishing between the surfaces having different average temperatures and temperature gradients in this manner, a boundary between the different surfaces is erroneously detected as the damaged part. Further, another surface is included in a pixel range used for the smoothing, and thus there is a problem that the temperature gradient cannot be reduced correctly.

The present invention has been made in view of such circumstances, and an object of the present invention is to provide an infrared thermal image analysis device, an infrared thermal image analysis method, and a program capable of correctly reducing a temperature gradient.

An infrared thermal image analysis device according to a first aspect of the present invention is an infrared thermal image analysis device comprising a processor. The processor acquires a first infrared thermal image of a structure surface, which is obtained by capturing a structure to be inspected, acquires region information that distinguishes a region of the structure surface corresponding to the first infrared thermal image for at least one region, estimates a temperature gradient in the at least one region based on the region information and a second infrared thermal image, and reduces an influence of the temperature gradient from the first infrared thermal image.

In the infrared thermal image analysis device according to a second aspect, the processor acquires the region information based on information related to the structure including a visible image obtained by capturing the structure.

In the infrared thermal image analysis device according to a third aspect, the processor acquires the region information based on information related to the structure including at least one of the first infrared thermal image or the second infrared thermal image obtained by capturing the structure.

In the infrared thermal image analysis device according to a fourth aspect, the processor acquires the region information based on information related to the structure including data obtained by measuring a distance to the structure.

In the infrared thermal image analysis device according to a fifth aspect, the processor acquires the region information based on information related to the structure including drawing data of the structure.

In the infrared thermal image analysis device according to a sixth aspect, the processor preferentially applies the second infrared thermal image in the region to the second infrared thermal image in another region to estimate the temperature gradient in the region.

In the infrared thermal image analysis device according to a seventh aspect, the processor performs, in the preferential application, smoothing processing on the second infrared thermal image with different weights for the region and the other region.

In the infrared thermal image analysis device according to an eighth aspect, the processor performs, in the preferential application, smoothing processing on the second infrared thermal image with extension along a boundary of the region in a range not including the other region.

In the infrared thermal image analysis device according to a ninth aspect, the processor preferentially applies the second infrared thermal image in a peripheral region of the region to estimate the temperature gradient in the region.

In the infrared thermal image analysis device according to a tenth aspect, the peripheral region is, in a case where a smallest distance among distances from pixels in the region to each pixel on a boundary of the region is defined as a distance from each of the pixels to the boundary and a distance at a pixel having a largest distance to the boundary is defined as a distance from a center to the boundary, a region including at least a pixel whose distance to the boundary is ½ or less of the distance from the center to the boundary.

In the infrared thermal image analysis device according to an eleventh aspect, the processor estimates the temperature gradient in the region by thermal simulation.

In the infrared thermal image analysis device according to a twelfth aspect, the processor subtracts the temperature gradient from the first infrared thermal image or divides the first infrared thermal image by the temperature gradient in a case where the influence of the temperature gradient is reduced.

In the infrared thermal image analysis device according to a thirteenth aspect, at least one of the first infrared thermal image, the second infrared thermal image, or information related to the structure on which the region information is based is acquired at a different timing.

In the infrared thermal image analysis device according to a fourteenth aspect, at least one of the first infrared thermal image, the second infrared thermal image, or information related to the structure on which the region information is based is an image or information obtained by integrating a plurality of images or pieces of information.

In the infrared thermal image analysis device according to a fifteenth aspect, the processor acquires the first infrared thermal image and the second infrared thermal image at a timing of solar radiation.

In the infrared thermal image analysis device according to a sixteenth aspect, the structure surface includes at least one of a plurality of surfaces having different inclinations or discontinuous surfaces.

In the infrared thermal image analysis device according to a seventeenth aspect, the processor displays a temperature gradient reduction image in which the influence of the temperature gradient is reduced from the first infrared thermal image on a display device.

In the infrared thermal image analysis device according to an eighteenth aspect, the processor displays the temperature gradient reduction image subjected to image processing on the display device.

In the infrared thermal image analysis device according to a nineteenth aspect, the first infrared thermal image and the second infrared thermal image are the same infrared thermal image.

An infrared thermal image analysis method according to a twentieth aspect comprises acquiring a first infrared thermal image of a structure surface, which is obtained by capturing a structure to be inspected, acquiring region information that distinguishes a region of the structure surface corresponding to the first infrared thermal image for at least one region, estimating a temperature gradient in the at least one region based on the region information and a second infrared thermal image, and reducing an influence of the temperature gradient from the first infrared thermal image.

A program according to a twenty-first aspect causes a computer to execute acquiring a first infrared thermal image of a structure surface, which is obtained by capturing a structure to be inspected, acquiring region information that distinguishes a region of the structure surface corresponding to the first infrared thermal image for at least one region, estimating a temperature gradient in the at least one region based on the region information and a second infrared thermal image, and reducing an influence of the temperature gradient from the first infrared thermal image.

With the infrared thermal image analysis device, the infrared thermal image analysis method, and the program of the present invention, the temperature gradient can be correctly reduced.

BRIEF DESCRIPTION OF THE DRAWINGS

FIG. 9 is a diagram showing a first form of processing in a temperature gradient estimation step.

FIGS. 11A to 11D are diagrams showing a third form of the processing in the temperature gradient estimation step.

DESCRIPTION OF THE PREFERRED EMBODIMENTS

Figure 1:
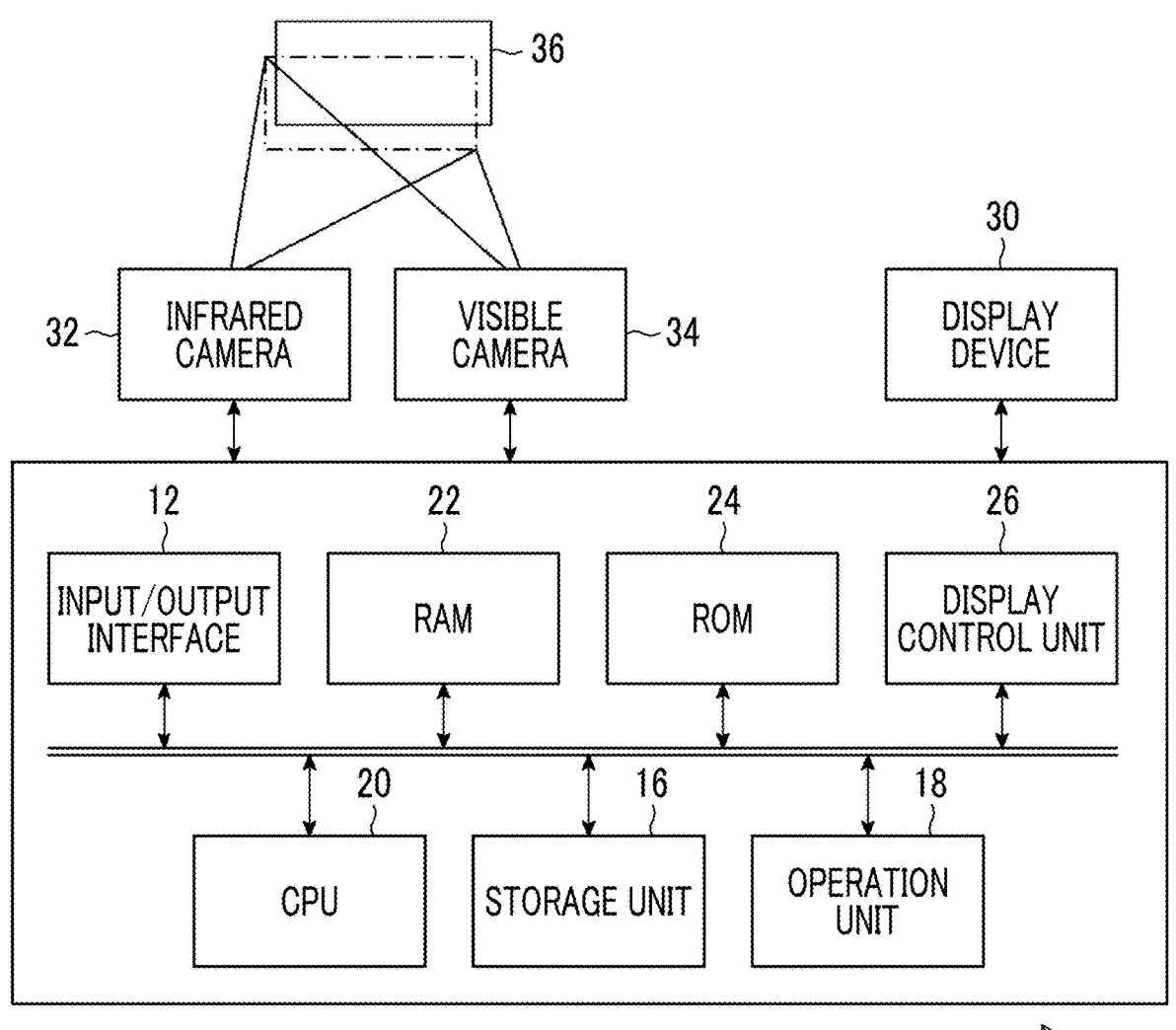
FIG. 1 is a block diagram showing an example of a hardware configuration of an infrared thermal image analysis device.

Hereinafter, preferred embodiments of an infrared thermal image analysis device, an infrared thermal image analysis method, and the program according to the present invention will be described with reference to accompanying drawings. In the specification, a temperature distribution is a temperature difference (temperature change) caused by a sound part and a damaged part, and a temperature gradient is a temperature difference (temperature change) that is not the temperature distribution.

As described above, the present inventor has found that in a case where the infrared thermal image is smoothed and the difference is taken, there is a problem that the boundary between the different surfaces is erroneously detected as the damaged part, another surface is included in the pixel range used for the smoothing, and thus the temperature gradient cannot be correctly reduced, and has reached the present invention.

Further, differences in average temperatures and temperature gradients on each surface of a structure may occur not only in a case where the structure receives solar radiation directly but also in a case where the structure receives the solar radiation indirectly. Further, the differences therein may occur due to reception of reflected light or radiated light of random light including an infrared ray from the periphery of the structure as well as the solar radiation (that is, the difference therein may occur regardless of day or night). Further, in a case where the surface of the structure has a plurality of regions having different colors, roughness, unevenness, or thermal conductivity or emissivity, differences in the average temperature and the temperature gradient in each region may occur similarly due to a difference in an amount of heat received or an amount of heat dissipated in each region, and a similar problem may occur. Further, even in a case where the surface of the structure has regions exposed and not exposed to the solar radiation or light other than the solar radiation, differences in the average temperature and the temperature gradient in each region may occur similarly due to a difference in an amount of heat received or an amount of heat dissipated in each region, and a similar problem may occur. Further, even in a case where the surface of the structure is uniform, in a case where there is a portion on a part of the surface where the amount of heat received or the amount of heat dissipated is locally different due to a step, a dent, a break, another member, or the like, temperature gradients in different orientations may occur with the portion as a starting point, and a similar problem may occur. Further, in a case where the structure has a plurality of surfaces having different inclinations, since an image obtained by projecting infrared thermal radiation from the structure surface in three dimensions in two dimensions in an imaging direction of an infrared camera is the infrared thermal image in the first place, the orientation and inclination of the temperature gradient in each structure surface in the infrared thermal image naturally differ depending on an angle between the structure surface and the imaging direction and the average temperature may also differ. Thus, in a case where the infrared thermal image is smoothed and the difference is taken without distinguishing between the surfaces, the above problem occurs. Of course, there is also a surface that is a shadow of another surface, and the three-dimensionally discontinuous surfaces are adjacent to each other and are continuous in the infrared thermal image in that case. Thus, in a case where the infrared thermal image is smoothed and the difference is taken without distinguishing between the surfaces, the above problem occurs.

As described above, in a case where the structure has the plurality of surfaces having different inclinations or discontinuous surfaces (for example, shadow surface, each surface separated by a step, a dent, a break, another member, or the like), the plurality of regions having different colors, roughness, unevenness, or thermal conductivity or emissivity, the regions exposed and not exposed to the solar radiation or the light other than the solar radiation, or the like, the differences in the average temperature and the temperature gradient may occur in each region. Thus, in a case where the infrared thermal image is smoothed and the difference is taken without distinguishing between these regions, the problem may occur that the boundary between the respective regions is erroneously detected as the damaged part and the temperature gradient cannot be correctly reduced. This problem may occur regardless of day or night. The present inventor has found the above and has reached each embodiment.

[Hardware Configuration of Infrared Thermal Image Analysis Device]

FIG. 1 is a block diagram showing an example of a hardware configuration of an infrared thermal image analysis device according to an embodiment.

A computer or a workstation can be used as an infrared thermal image analysis device 10 shown in FIG. 1. The infrared thermal image analysis device 10 of the present example is mainly configured of an input/output interface 12, a storage unit 16, an operation unit 18, a central processing unit (CPU) 20, a random access memory (RAM) 22, a read only memory (ROM) 24, and a display control unit 26. A display device 30 is connected to the infrared thermal image analysis device 10, and a display is performed on the display device 30 by control of the display control unit 26 under a command of the CPU 20. The display device 30 is configured of, for example, a monitor.

Various pieces of data (information) can be input to the infrared thermal image analysis device 10 using the input/output interface 12 (input/output I/F in drawing). For example, data stored in the storage unit 16 is input via the input/output interface 12.

The CPU (processor) 20 reads out various programs stored in the storage unit 16, the ROM 24, or the like, expands the programs in the RAM 22, and performs calculations to integrally control each unit. Further, the CPU 20 reads out a program stored in the storage unit 16 or the ROM 24 and performs a calculation using the RAM 22 to perform various types of processing of the infrared thermal image analysis device 10.

An infrared camera 32 shown in FIG. 1 captures a structure 36 to be inspected to acquire an infrared thermal image of a structure surface. A visible camera 34 captures the structure 36 to be inspected to acquire a visible image of the structure 36.

The infrared thermal image analysis device 10 can acquire the infrared thermal image from the infrared camera 32 via the input/output interface 12. Further, the infrared thermal image analysis device 10 can acquire the visible image from the visible camera 34 via the input/output interface 12. The acquired infrared thermal image and visible image can be stored in, for example, the storage unit 16.

Figure 2:
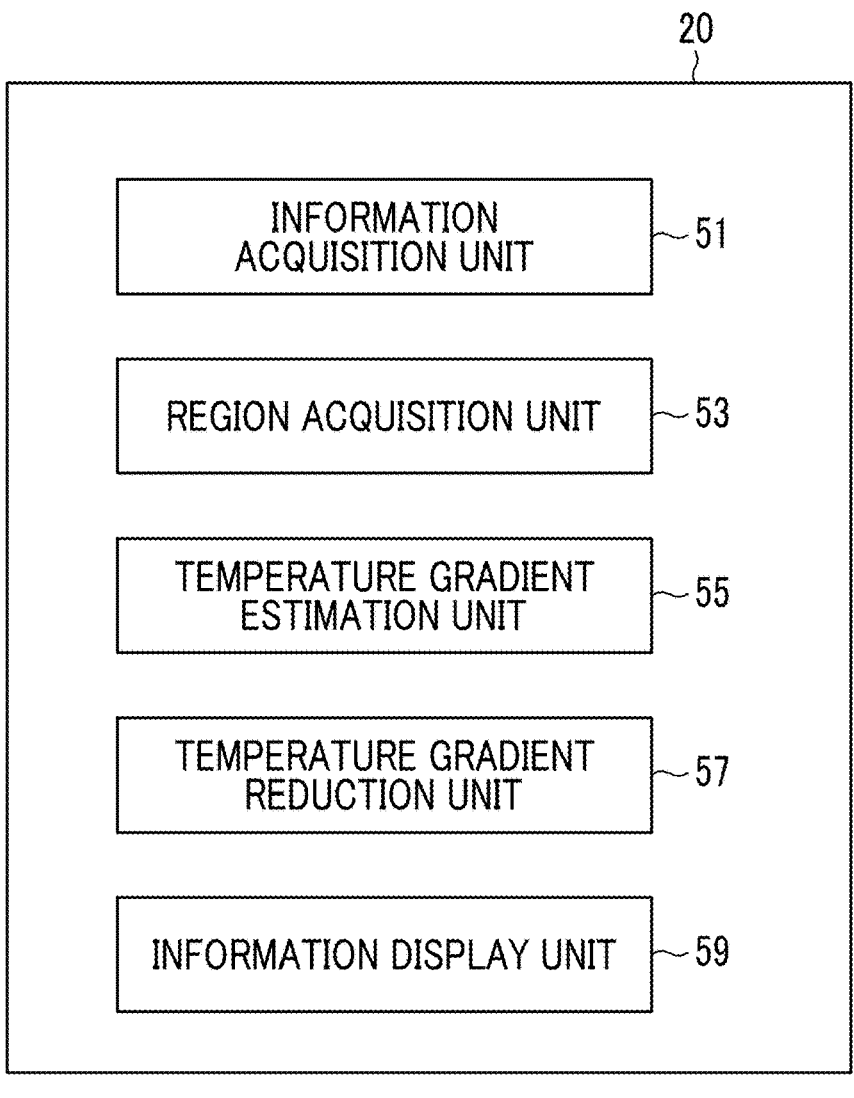
FIG. 2 is a block diagram showing a processing function realized by a CPU.

FIG. 2 is a block diagram showing a processing function realized by the CPU 20.

The CPU 20 functions as an information acquisition unit 51, a region acquisition unit 53, a temperature gradient estimation unit 55, a temperature gradient reduction unit 57, and an information display unit 59. A specific processing function of each unit will be described below. The information acquisition unit 51, the region acquisition unit 53, the temperature gradient estimation unit 55, the temperature gradient reduction unit 57, and the information display unit 59 are a part of the CPU 20. Thus, it can be also said that the CPU 20 executes the processing of each unit.

Returning to FIG. 1, the storage unit (memory) 16 is a memory configured of a hard disk device, a flash memory, or the like. The storage unit 16 stores data and a program for operating the infrared thermal image analysis device 10, such as an operating system and a program for executing an infrared thermal image analysis method. Further, the storage unit 16 stores information and the like used in an embodiment described below. The program for operating the infrared thermal image analysis device 10 may be recorded on an external recording medium (not shown), distributed, and installed by the CPU 20 from the recording medium. Alternatively, the program for operating the infrared thermal image analysis device 10 may be stored in a server or the like connected to a network in a state accessible from the outside and downloaded to the storage unit 16 by the CPU 20 in response to a request to be installed and executed.

Figure 3:
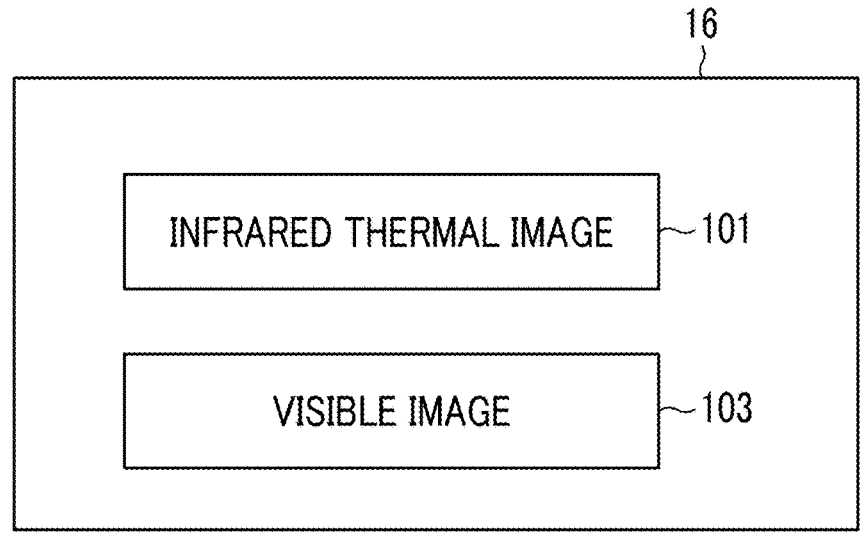
FIG. 3 is a diagram showing information and the like stored in a storage unit.

FIG. 3 is a diagram showing the information and the like stored in the storage unit 16. The storage unit 16 is configured of a non-temporary recording medium, such as a compact disk (CD), a digital versatile disk (DVD), a hard disk, or various semiconductor memories, and a control unit thereof.

The storage unit 16 mainly stores an infrared thermal image 101 and a visible image 103.

The infrared thermal image 101 is an image captured by the infrared camera 32 and an image showing a temperature distribution of the structure surface by detecting infrared radiation energy radiated from the structure 36 and converting the infrared radiation energy into a temperature. The visible image 103 is an image captured by the visible camera 34 and is an image showing a reflection intensity distribution of visible light from the surface of the structure 36. The visible image is usually configured of an RGB image in which reflection intensity distributions in three different wavelength ranges in a wavelength band of the visible light are imaged, that is, has color information (RGB signal value) for each pixel. It is assumed that the color information is also provided in the present example. Further, in the present example, it is assumed that there is no positional deviation between the infrared thermal image 101 and the visible image 103.

The operation unit 18 shown in FIG. 1 includes a keyboard and a mouse, and a user can cause the infrared thermal image analysis device 10 to perform necessary processing via these devices. With use of a touch-panel type device, the display device 30 can function as an operation unit.

The display device 30 is, for example, a device such as a liquid crystal display, and can display a result obtained by the infrared thermal image analysis device 10.

Figure 4:
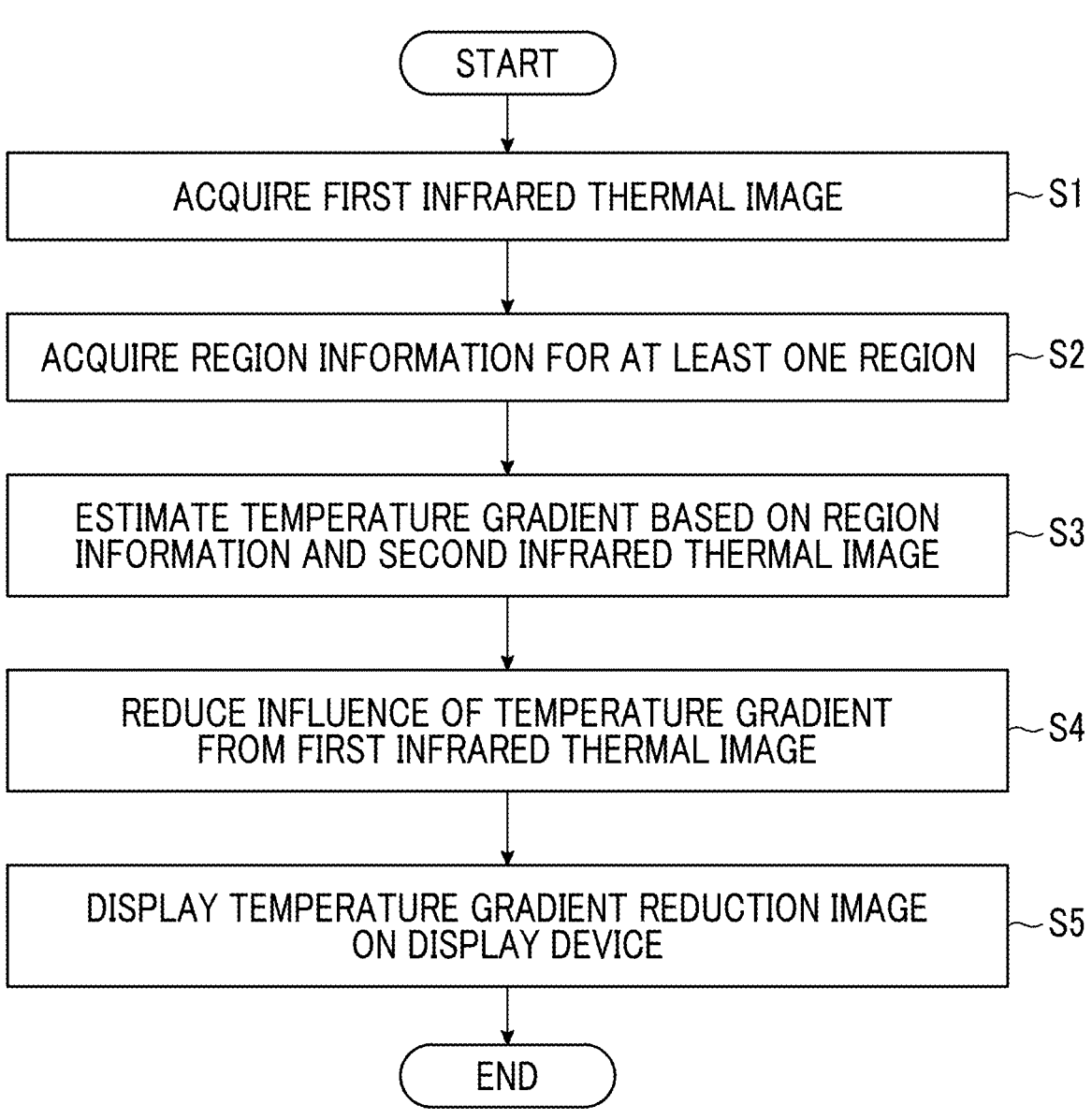
FIG. 4 is a flowchart showing an infrared thermal image analysis method using the infrared thermal image analysis device.

FIG. 4 is a flowchart showing the infrared thermal image analysis method using the infrared thermal image analysis device 10.

First, the information acquisition unit 51 acquires a first infrared thermal image of the structure surface in which the structure to be inspected is captured (first infrared image acquisition step: step S1). In the present example, the first infrared thermal image is the infrared thermal image 101 stored in the storage unit 16. The infrared thermal image 101 is acquired from the storage unit 16 by the information acquisition unit 51.

Next, the region acquisition unit 53 acquires region information that distinguishes regions on the structure surface corresponding to the first infrared thermal image for at least one region, based on information related to the structure (region acquisition step: step S2). In the present example, the information related to the structure is the visible image 103 stored in the storage unit 16. The visible image 103 is acquired from the storage unit 16 by the information acquisition unit 51. The region acquisition unit 53 acquires region information that distinguishes regions on the structure surface corresponding to the infrared thermal image 101, which is the first infrared thermal image, for at least one region, based on the visible image 103.

Next, the temperature gradient estimation unit 55 estimates the temperature gradient in at least one region based on the region information and a second infrared thermal image (temperature gradient estimation step: step S3). In the present example, the second infrared thermal image is the infrared thermal image 101 stored in the storage unit 16. Therefore, the first infrared thermal image and the second infrared thermal image are the same infrared thermal image 101. The infrared thermal image 101, which is the second infrared thermal image, has already been acquired in the first infrared image acquisition step (step S1). The temperature gradient estimation unit 55 estimates the temperature gradient in at least one region based on the region information and the infrared thermal image 101. Here, the estimated temperature gradient information may be any form of information as long as the influence of the temperature gradient can be reduced from the first infrared thermal image in a subsequent temperature gradient reduction step. For example, an image of the temperature gradient may be used, a mathematical formula in which the temperature gradient can be derived may be used, or a set of processing and data in which the temperature gradient can be derived may be used.

Hereinafter, the first infrared thermal image and the second infrared thermal image may be simply referred to as an "infrared thermal image" without distinguishing between the images.

Next, the temperature gradient reduction unit 57 reduces the influence of the temperature gradient from the first infrared thermal image (temperature gradient reduction step: step S4). In the present example, the influence of the temperature gradient is reduced from the infrared thermal image 101, which is the first infrared thermal image. The temperature gradient reduction unit 57 can acquire a temperature gradient reduction image.

Next, the information display unit 59 displays the temperature gradient reduction image on the display device 30 (information display step: step S5). The information display unit 59 can also display the temperature gradient reduction image subjected to image processing on the display device 30.

As described above, the infrared thermal image analysis device 10 of the present example estimates the temperature gradient from the region information acquired based on the visible image 103 and the infrared thermal image 101 to reduce the influence of the temperature gradient from the infrared thermal image 101.

In the infrared thermal image analysis method, the order of implementation of the first infrared image acquisition step (step S1) and the temperature gradient estimation step (step S3) is not limited as long as the above steps are prior to the temperature gradient reduction step (step S4).

Hereinafter, each step will be described with reference to an example in which the present invention is applied to a specimen imitating the structure 36 as a specific example.
<First Infrared Image Acquisition Step>

The first infrared image acquisition step (step S1) is executed by the information acquisition unit 51. The information acquisition unit 51 acquires the infrared thermal image 101 of the structure surface, which is stored in the storage unit 16 and is obtained by capturing the structure 36 to be inspected, as the first infrared thermal image. In a case where the infrared thermal image 101 is not stored in the storage unit 16, the information acquisition unit 51 acquires the infrared thermal image 101 from the outside. For example, the information acquisition unit 51 can acquire the infrared thermal image 101 through a network via the input/output interface 12. The information acquisition unit 51 can acquire the infrared thermal image 101 from the infrared camera 32 via the input/output interface 12.

Figure 5:
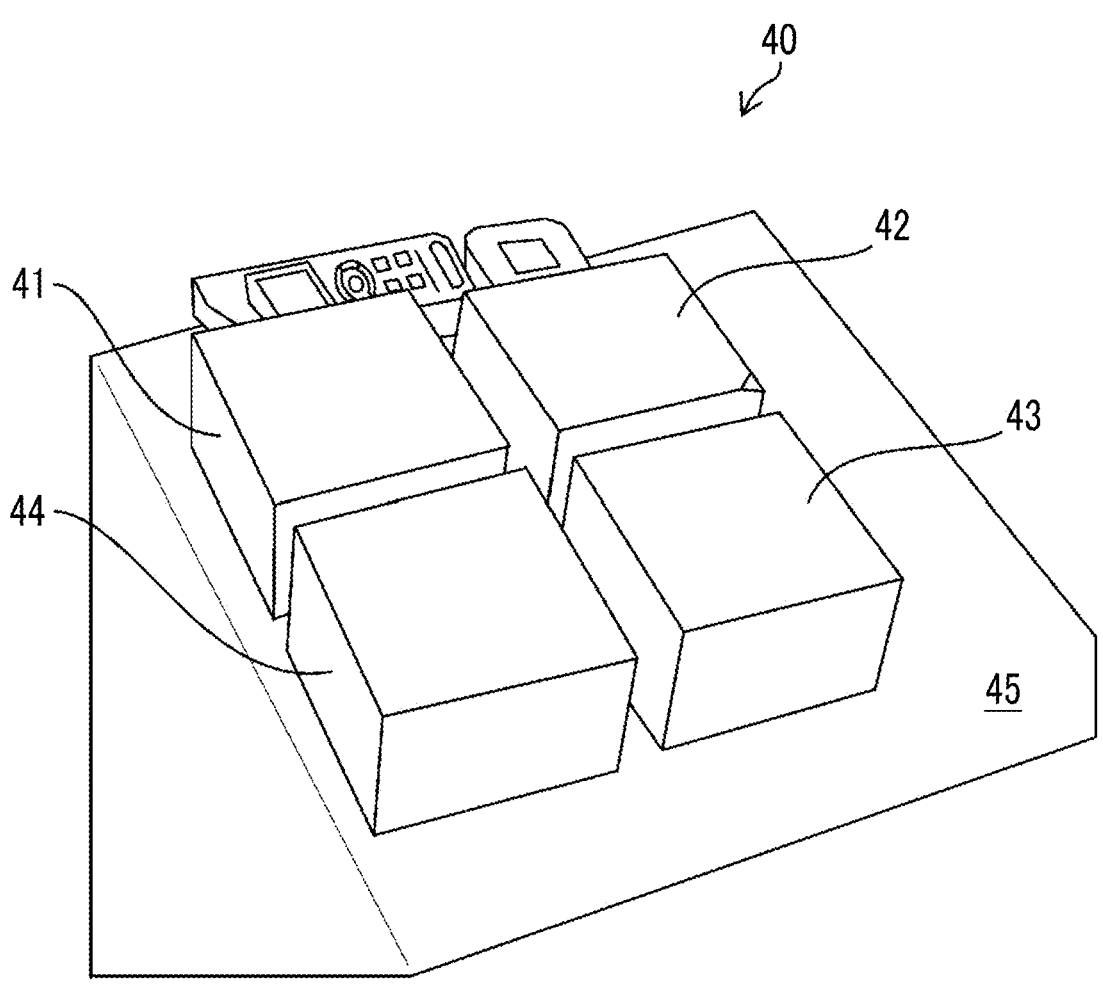
FIG. 5 is a perspective view for describing a specimen group imitating a structure.

FIG. 5 is a perspective view for describing a specimen group 40 imitating the structure 36. The specimen group 40 includes four specimens 41, 42, 43, and 44. Each of the specimens 41, 42, 43, and 44 is a rectangular parallelepiped block made of concrete, and is disposed on a cardboard 45 at spacings.

A simulated floating (cavity) is formed at a position of a depth of 1 cm from an upper surface of the specimen 44, at a position of a depth of 2 cm from an upper surface of the specimen 41, and at a position of a depth of 3 cm from an upper surface of the specimen 43. The specimen group 40 is disposed outdoors on a sunny daytime and is exposed to the solar radiation from an upper left. An infrared thermal image of the specimen group 40 is captured by the infrared camera 32.

Figure 6A:
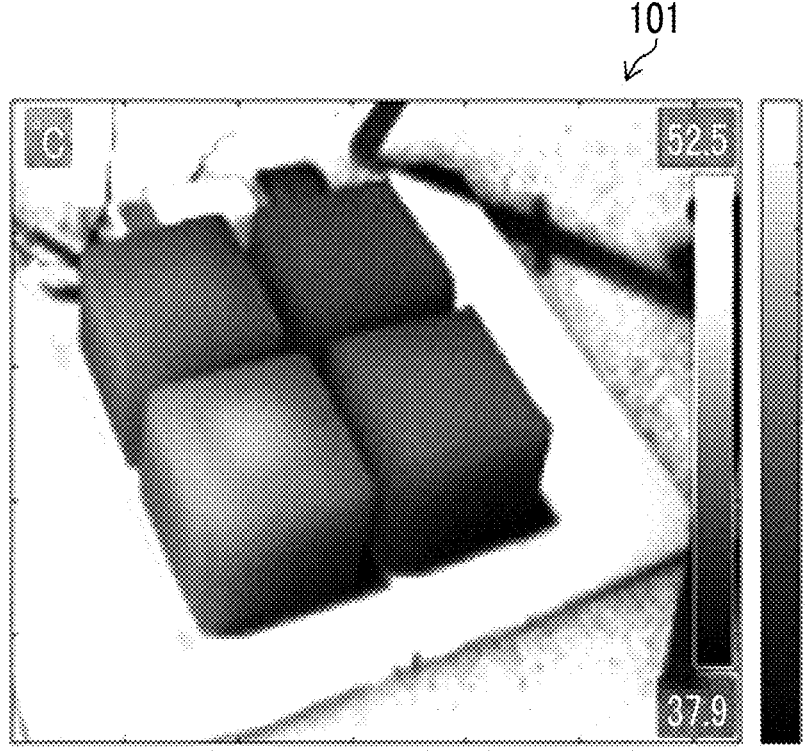
FIGS. 6A and 6B are infrared thermal images of the specimen group.
Figure 6B:
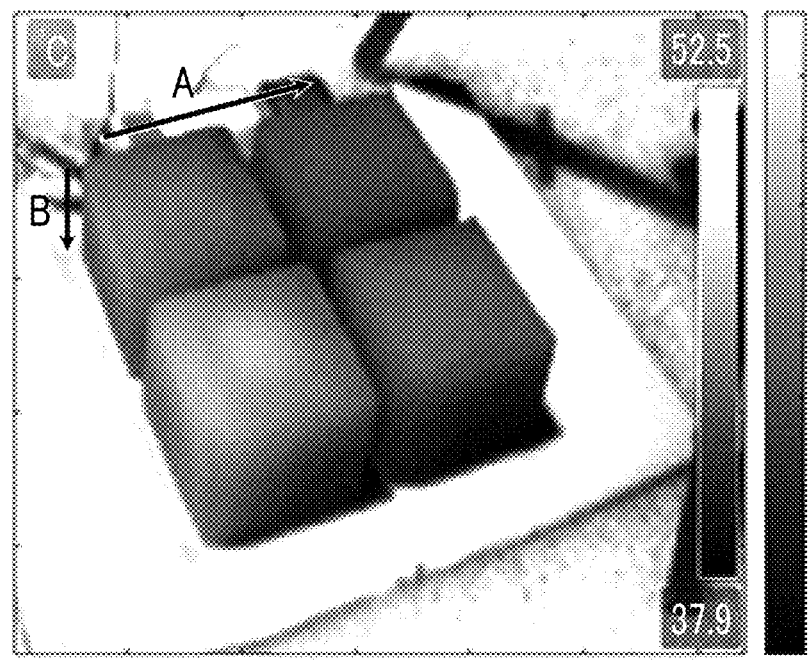

FIGS. 6A and 6B show infrared thermal images 101 captured by the infrared camera 32, which are acquired as the first infrared thermal image by the information acquisition unit 51. In the infrared thermal image 101, a temperature of each pixel is displayed on a gray scale in FIGS. 6A and 6B. FIG. 6A is the infrared thermal image 101 obtained by actually capturing the specimen group 40, and FIG. 6B is a diagram obtained by adding arrows indicating orientations of the temperature gradient to the infrared thermal image 101 of FIG. 6A.

As shown in FIG. 6B, it can be seen that the temperature gradient of an inclination decreasing from left to right (arrow A) on the upper surfaces of the four specimens 41, 42, 43, and 44 is generated from the infrared thermal image 101 of FIG. 6A. This temperature gradient is generated by the solar radiation from the upper left, and is caused by heat inflow from a left side surface direction near a boundary between the upper surface and a left side surface.

On the other hand, as shown in FIG. 6B, it can be seen that the temperature gradient of an inclination decreasing from top to bottom (arrow B) on left side surfaces of the four specimens 41, 42, 43, and 44 is generated from the infrared thermal image 101 of FIG. 6A. This temperature gradient is caused by the heat inflow from an upper surface direction near the boundary between the left side surface and the upper surface.

The temperature gradient is generated in any of the surfaces of the four specimens 41, 42, 43, and 44, and it is understood that temperature gradient is caused by the heat inflow from a direction of another surface near a boundary between any surface and another surface.

The orientation of the temperature gradient differs depending on each surface of the specimens 41, 42, 43, and 44. Further, since the amount of heat received due to the solar radiation on each surface of the specimens 41, 42, 43, and 44 is different, an average temperature of each surface is also different and an amount of heat inflow from the direction of another surface near the boundary between each surface and another surface is different. As a result, the inclination of the temperature gradient is also different.

<Region Acquisition Step>

The region acquisition step (step S2) is executed by the region acquisition unit 53. First, in the present example, the information acquisition unit 51 acquires the visible image 103 of the structure surface, which is stored in the storage unit 16 and is obtained by capturing the structure 36 to be inspected. In a case where the visible image 103 is not stored in the storage unit 16, the information acquisition unit 51 acquires the visible image 103 from the outside. For example, the information acquisition unit 51 can acquire the visible image 103 through the network via the input/output interface 12 and can acquire the visible image 103 from the visible camera 34 via the input/output interface 12.

Figure 7:
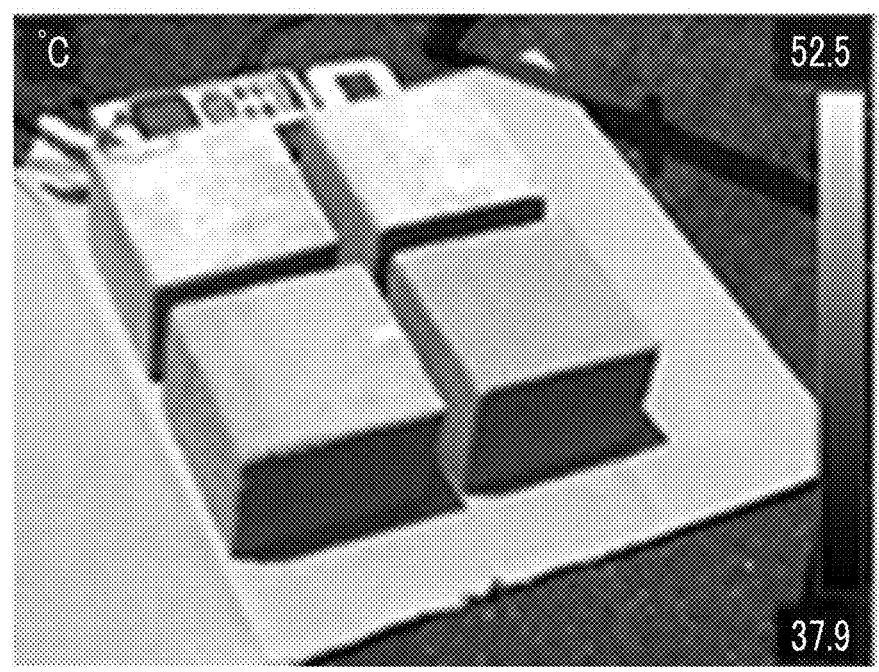
FIG. 7 is a visible image of the specimen group.

FIG. 7 is the visible image 103 obtained by capturing the specimen group 40 with the visible camera 34. As described above, the visible image 103 has the RGB signal value for each pixel.

The region acquisition unit 53 acquires the region information that distinguishes each region on the structure surface based on the acquired RGB signal value of the visible image 103 and spatial feature information such as an edge or a texture.

The region acquisition unit 53 extracts, for example, a pixel group that can be regarded as a concrete surface from each pixel of the visible image 103. In a case where the RGB signal value of each pixel is included in, for example, a predetermined range that can be regarded as the RGB value of the concrete surface, each pixel is extracted as the pixel group that can be regarded as the concrete surface.

After extracting the pixel group, the region acquisition unit 53 further finely distinguishes the pixel group based on the RGB signal value of each pixel and the spatial feature, fills each pixel group with a morphology expansion calculation, expands the pixel group, and finally contracts each pixel group expanded to an optimum region using a dynamic contour method to determine a region corresponding to each pixel group. As the dynamic contour method, Snakes, a Level set method, or the like can be applied.

Based on the RGB signal value of the visible image 103 and the spatial feature information, the region acquisition unit 53 can perform the distinguishment by regarding at least one of the surfaces having different inclinations or the discontinuous surfaces on the structure surface as different regions. Further, the region acquisition unit 53 can perform the distinguishment by regarding regions where any one of color, roughness, unevenness, and presence or absence of the solar radiation on the structure surface is different as different regions. The discontinuous surface includes, for example, a shadow surface, each surface separated by a step, a dent, a break, another member, or the like.

With the execution of the above processing, the region acquisition unit 53 acquires the region information that distinguishes each region on the structure surface.

By the way, in the visible image 103, there may be a case where the RGB signal value of each pixel in the region and the RGB signal value of each pixel in the periphery of the region are close to each other and thus a region boundary is difficult to be determined. For example, in FIG. 7, the RGB signal value of the specimen 43, among the four specimens 41, 42, 43, and 44, is close to a signal value of the surrounding cardboard 45, and a boundary on a right side of the specimen 43 is difficult to be determined.

On the other hand, in the infrared thermal image 101 shown in FIG. 6A, a temperature difference (difference in signal value) between the specimen 43 and the cardboard 45 is remarkably large, and the boundary is clearly represented. In such a case, the region acquisition unit 53 can determine the optimum region based on both the visible image 103 and the infrared thermal image 101 and acquire the region information.

There may be a case where the region is difficult to be determined with only the visible image, such as in a case of imaging of a shaded portion of the structure that is not exposed to the solar radiation or imaging at night. In that case, the region is preferably determined based on both the visible image and the infrared thermal image.

In a case where the structure surface includes a region having different thermal conductivity or infrared emissivity, such as a repair material (repair mark), on the structure surface, the average temperature and the temperature gradient may be different due to a difference in the amount of heat received or the amount of heat dissipated from a surrounding concrete region in the region. The region determination may be difficult with the visible image in the region where the thermal conductivity or the infrared emissivity is different, and thus the region is preferably determined based on the infrared thermal image. In a case where the infrared thermal image is applied as the information related to the structure in a case where the region information is acquired, it is sufficient that any one of the first infrared thermal image or the second infrared thermal image is included.

There are many methods of distinguishing and determining regions, such as a MeanShift method and a Graph Cuts method. Any method may be applied to determine the region. Machine learning may be applied to determine the region. For example, the region may be determined using a method such as a convolutional neural network (CNN), a fully convolution network (FCN), convolutional networks for biomedical image segmentation (U-net), or a deep convolutional encoder-decoder architecture for image segmentation (SegNet). The method is not particularly limited as long as it is a method based on the features of the visible image and the infrared thermal image, and any method may be applied.

The region acquisition unit 53 acquires a necessary number of pieces of region information (regions Ar(i); i=1,2, 3, . . . , N) that distinguishes regions on the structure surface.

Figure 8:
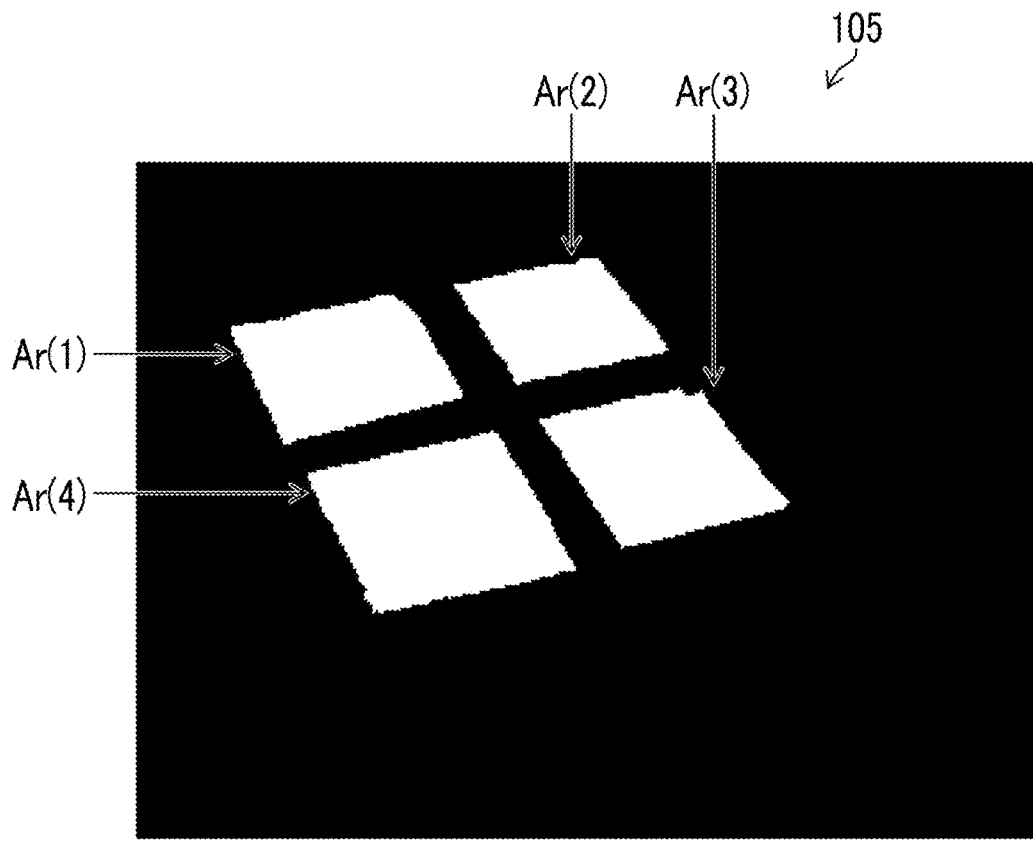
FIG. 8 is a diagram showing results of determination by distinguishing upper surfaces of four specimens.

FIG. 8 is a diagram of region information 105 that is an acquired result of distinguishing the upper surfaces of the four specimens 41, 42, 43, and 44 as four regions, based on the features of the visible image 103 and the infrared thermal image 101, by the region acquisition unit 53. Regions Ar(1), Ar(2), Ar(3), and Ar(4) indicate regions corresponding to the upper surfaces of the specimens 41, 42, 43, and 44. In the present example, the temperature gradient estimation step and the temperature gradient reduction step are executed for the four regions Ar(1), Ar(2), Ar(3), and Ar(4).

<Temperature Gradient Estimation Step>

The temperature gradient estimation step (step S3) is executed by the temperature gradient estimation unit 55. The temperature gradient estimation unit 55 estimates the temperature gradient of the region Ar(i) from the infrared thermal image of the acquired region Ar(i). In the present example, the temperature gradient is estimated for each of the four regions Ar(1), Ar(2), Ar(3), and Ar(4).

There are some examples as a method of estimating the temperature gradient. The temperature gradient estimation unit 55 can, for example, derive an image of a global temperature change by applying a smoothing filter having a predetermined number of pixels to the infrared thermal image to estimate the temperature gradient.

In this case, the temperature gradient estimation unit 55 applies the infrared thermal image of the region Ar(i) more preferentially than a region other than the region Ar(i), that is, a region where the average temperature and the temperature gradient (orientation and/or inclination) are different from the region Ar(i) to estimate the temperature gradient.

Figure 9:
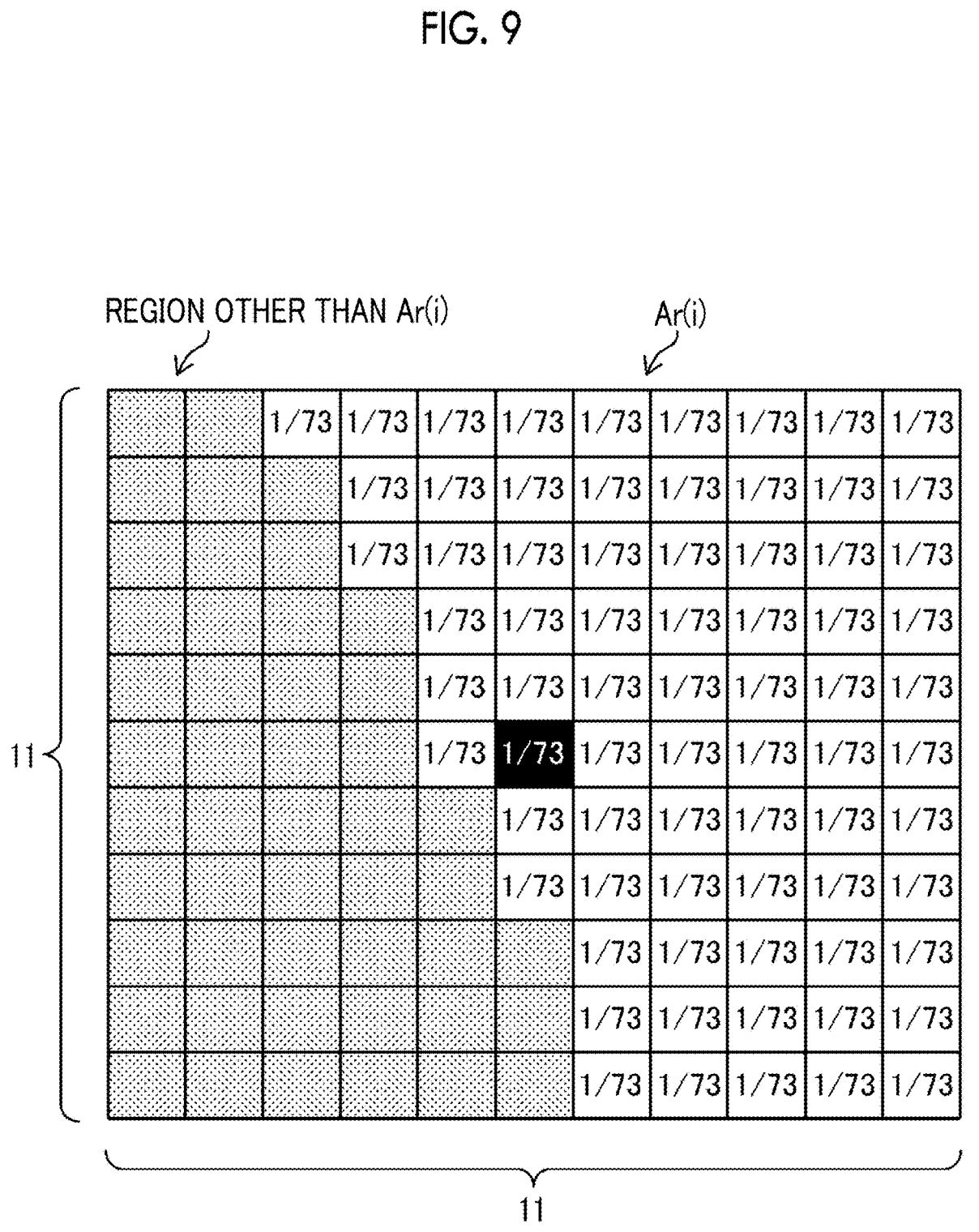

FIG. 9 is a diagram showing a first form of processing in the temperature gradient estimation step. FIG. 9 shows an example of the smoothing filter of 11×11 pixels (121 pixels) centered on an attention pixel (indicated by black pixel). In the vicinity of a boundary of the region Ar(i), the smoothing filter in a range not exceeding the boundary is applied, and the temperature gradient estimation unit 55 executes the smoothing processing. A range exceeding the boundary of the region Ar(i) is indicated in gray. In this case, a filter coefficient is set such that a total in the range of the regions Ar(i) not exceeding the boundary is "1". In FIG. 9, the filter coefficient of "⅟₇₃" is set. In a case of the filter having 121 pixels, the coefficient is set to "⅟₁₂₁" in a case where all the pixels of the filter do not exceed the boundary.

Even in a case where the filter coefficient is changed according to a pixel position as in a Gaussian filter, each filter coefficient can be multiplied by a constant such that a total value is 1. Here, the Gaussian filter means a filter whose filter coefficient increases as it is closer to the attention pixel according to a Gaussian distribution function.

Figure 10:
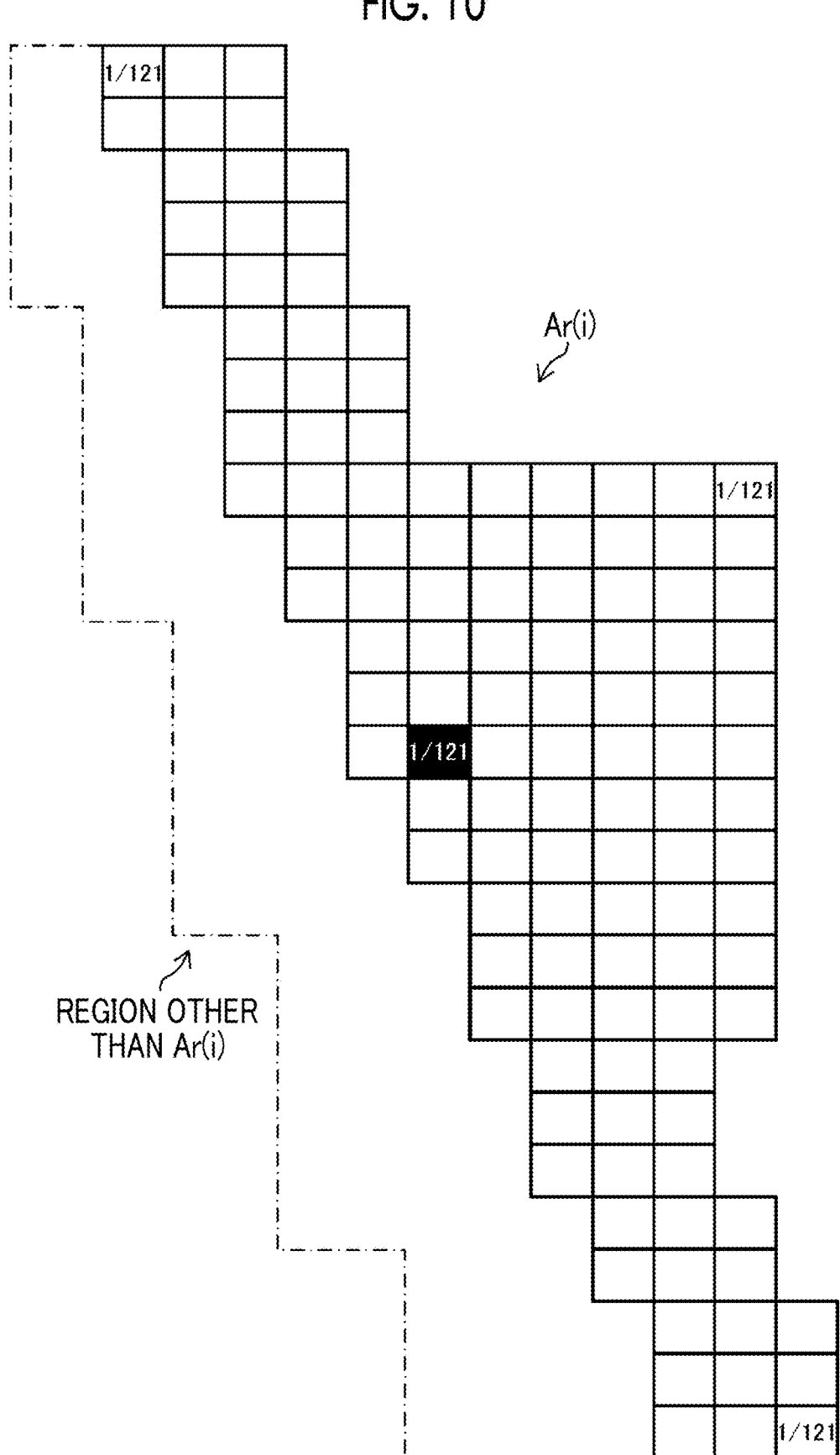
FIG. 10 is a diagram showing a second form of the processing in the temperature gradient estimation step.

FIG. 10 is a diagram showing a second form of the processing in the temperature gradient estimation step. As shown in FIG. 10, the temperature gradient estimation unit 55 performs the smoothing processing of extending the smoothing filter along the boundary within the range of the region Ar(i) near the boundary of the region Ar(i). In this case, the filter coefficient is constant because the number of pixels of the filter does not change regardless of a position of the attention pixel. In the present example, the smoothing filter of 11×11 pixels (121 pixels) is extended along the boundary of the region, and the filter coefficient of "⅟₁₂₁" is set. In FIG. 10, the filter coefficient of "⅟₁₂₁" is displayed only in a part of the pixels.

Next, a third form of the processing in the temperature gradient estimation step will be described. As described above, in a case where the structure surface is configured of the plurality of regions having different amounts of heat received or dissipated, the temperature gradient is generated in each region due to heat inflow or outflow from another adjacent region near the boundary. The plurality of regions having different amounts of heat received or dissipated include a case where the configuration is made from the plurality of surfaces having different inclinations and a case where the configuration is made from the plurality of regions having different colors, roughness, unevenness, presence or absence of solar radiation, thermal conductivity, and infrared emissivity.

This indicates that the vicinity of the boundary is the starting point of the temperature gradient. The vicinity of the boundary is similarly the starting point of the temperature gradient also in each discontinuous region separated by a step, a dent, a break, another member, or the like. From this phenomenon, it can be understood that the temperature gradient may be estimated based on the infrared thermal image near the boundary in each region.

This method is preferable to a method of estimating the temperature gradient based on an infrared thermal image of the entire region since this method is not affected by a temperature distribution (temperature change that is not temperature gradient) due to a damaged part in the region.

The third form of the processing in the temperature gradient estimation step will be described with reference to FIGS. 11A to 11D.

Figures 11A, 11B, 11C, 11D:
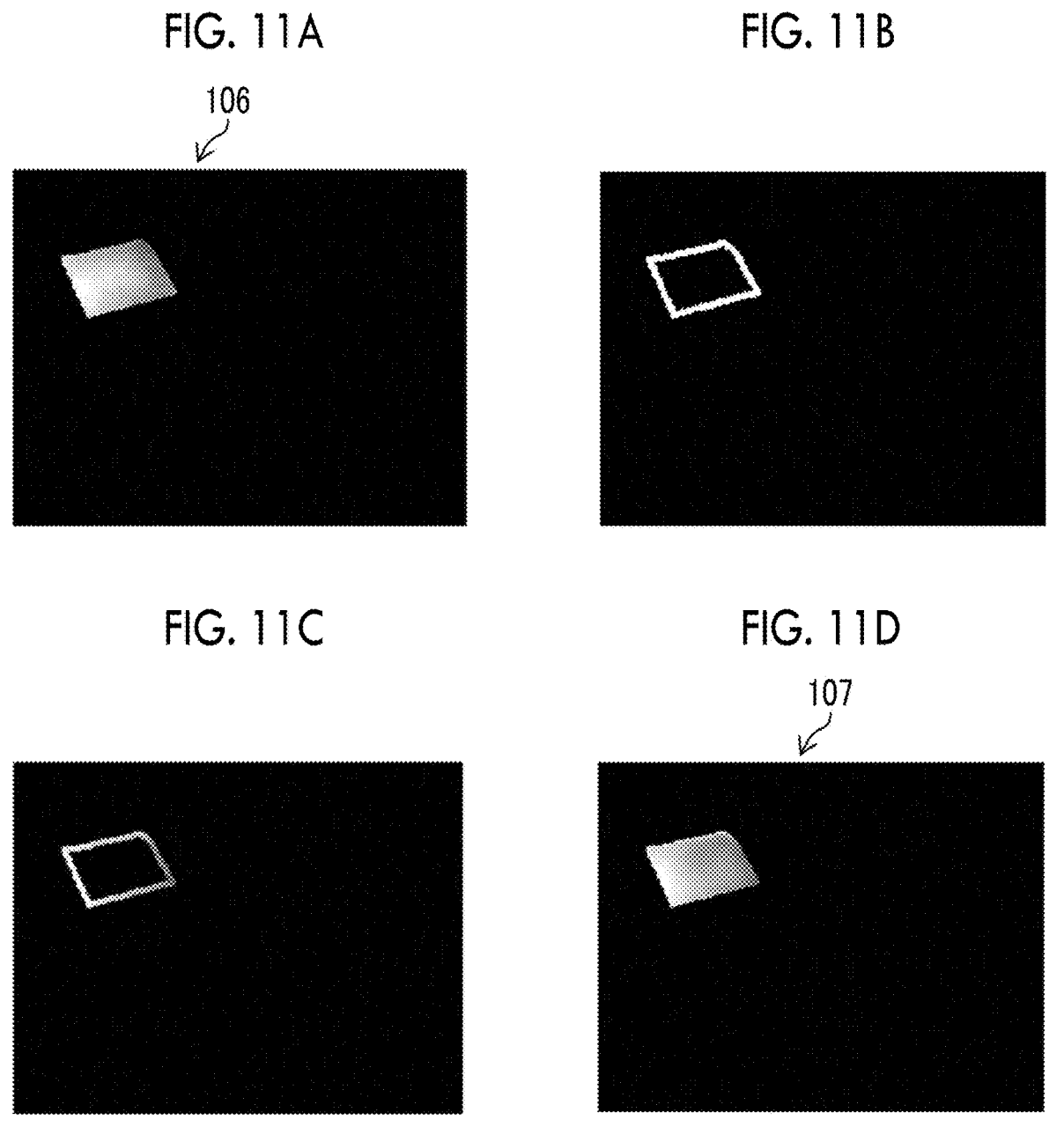

FIG. 11A is an infrared thermal image 106 of the region Ar(1) on the upper surface of the specimen 41. The infrared thermal image 106 is an image obtained by extracting only the region Ar(1) on the upper surface of the specimen 41 from the infrared thermal image 101 of the specimen group 40 based on the region information 105. Here, the infrared thermal image 106 is an original image of a temperature gradient image 107 derived thereafter and thus is preferably an image obtained by smoothing the infrared thermal image 101. However, smoothing is not essential.

FIG. 11B is an image obtained by extracting the periphery of the boundary of the region Ar(1) of the region information 105 shown in FIG. 8 with a predetermined width. Therefore, FIG. 11B shows only the peripheral region of the region Ar(1).

FIG. 11C is an image obtained by extracting only the infrared thermal image of the peripheral region of the region Ar(1) based on the infrared thermal image 106 of FIG. 11A and the region information that the periphery of the boundary of FIG. 11B is extracted.

FIG. 11D is the temperature gradient image 107 derived from the infrared thermal image of the peripheral region of FIG. 11C by an interpolation calculation. Here, spline interpolation is applied for continuous (smooth) interpolation to a second derivative from the infrared thermal image of the peripheral region. As described above, with the estimation of the temperature gradient from the peripheral region, it is possible to reduce the influence of the temperature distribution (temperature difference) between the sound part and the damaged part existing in the region in the estimation of the temperature gradient. The interpolation calculation is not particularly limited, and another interpolation calculation other than the spline interpolation can be applied. For example, a linear interpolation may be used.

Figure 12A:
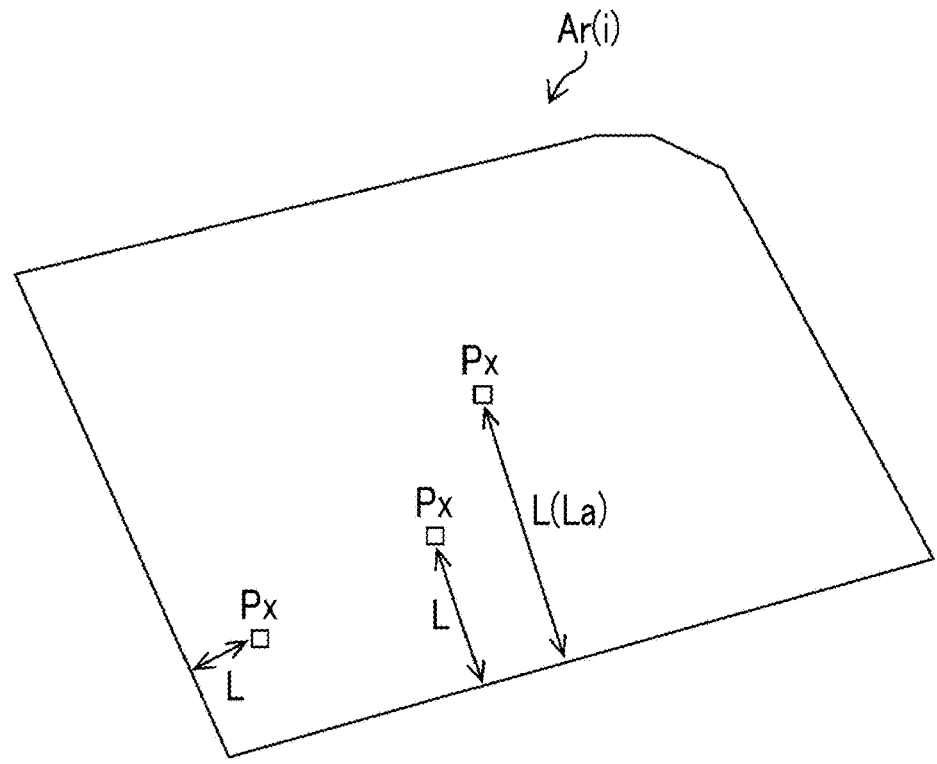
FIGS. 12A and 12B are diagrams for describing a peripheral region of an infrared thermal image.
Figure 12B:
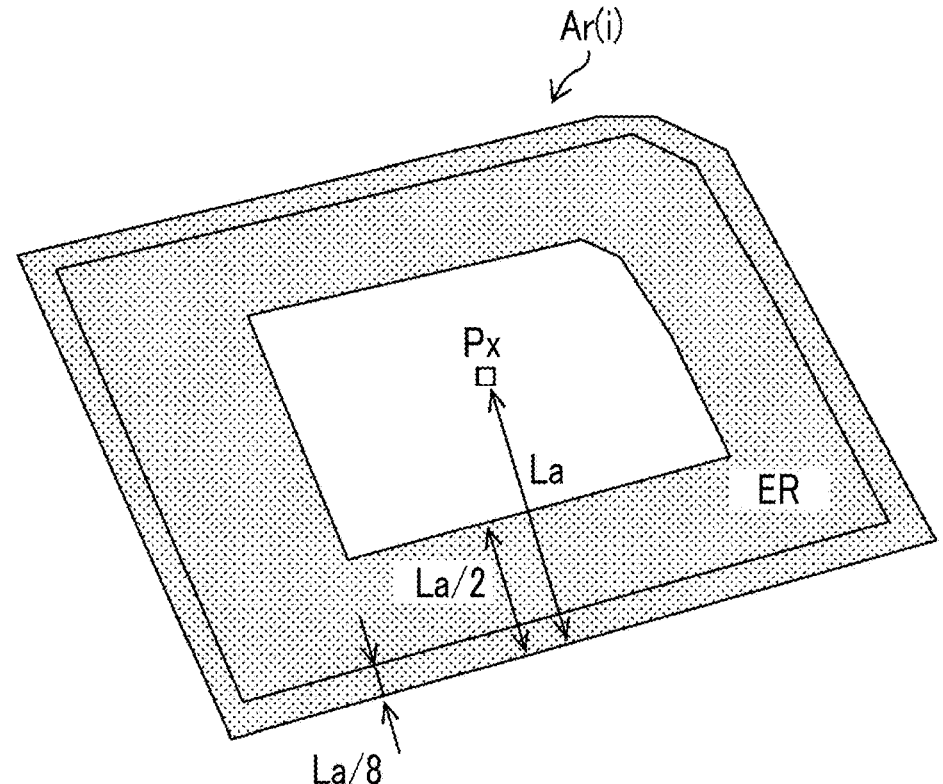

Next, the peripheral regions in FIG. 11B and FIG. 11C will be described with reference to FIGS. 12A and 12B. FIG. 12A is a diagram for describing a distance L from each pixel of the infrared thermal image of the region Ar(i) to the boundary and a distance La from the center of the region Ar(i) to the boundary. FIG. 12B is a diagram for describing the peripheral region of the region Ar(i).

As shown in FIGS. 12A and 12B, a smallest distance among distances from a pixel Px included in the infrared thermal image in the region Ar(i) to each pixel on the boundary of the region Ar(i) is defined as the distance L from the pixel Px to the boundary. A largest distance L among the distances L from each pixel Px to the boundary L is defined as a distance La from the center to the boundary. In the region Ar(i), a region consisting of pixels Px whose distance L to the boundary is smaller than the distance La from the center to the boundary is defined as the peripheral region. FIG. 12B displays a peripheral region ER consisting of pixels Px whose distance L to the boundary is ½ or less of the distance La from the center to the boundary in a dot pattern. Further, a peripheral region consisting of pixels Px of ⅛ or less thereof is also shown. Here, as the third form of the processing in the temperature gradient estimation step, a method of estimating the temperature gradient based only on the infrared thermal image (or smoothed infrared thermal image) of the peripheral region has been described in the example of FIGS. 11A to 11D. However, the temperature gradient may not be always estimated only from the infrared thermal image of the peripheral region and may be estimated by preferentially applying the infrared thermal image of the peripheral region. For example, in a case where the temperature gradient of the region Ar(i) is derived from the infrared thermal image of the peripheral region of the region Ar(i) by the interpolation calculation, in the region Ar(i), the temperature gradient may be derived from the infrared thermal image of the region including not only the peripheral region but also another region (region other than peripheral region) by the interpolation calculation. In a case, the interpolation may be performed by applying a larger weight to the infrared thermal image of the peripheral region than the infrared thermal image of another region or the interpolation may be performed by applying more pixels in the peripheral region than pixels in another region, for example, by applying the pixels in the region other than the peripheral region in a sparse manner. At least, it is preferable to preferentially apply the infrared thermal image of the peripheral region where the distance L to the boundary is ½ or less of the distance La from the center to the boundary to estimate the temperature gradient. Further, at least, it is preferable to preferentially apply an infrared thermal image of a peripheral region where the distance L to the boundary is ¼ or less of the distance La from the center to the boundary to estimate the temperature gradient. Further, at least, it is preferable to preferentially apply an infrared thermal image of a peripheral region where the distance L to the boundary is ⅛ or less of the distance La from the center to the boundary to estimate the temperature gradient. A smallest value of the distance L to the boundary is a distance corresponding to one pixel.

As described above, in the temperature gradient estimation step, the temperature gradient is estimated by the temperature gradient estimation unit 55.

Figure 13:
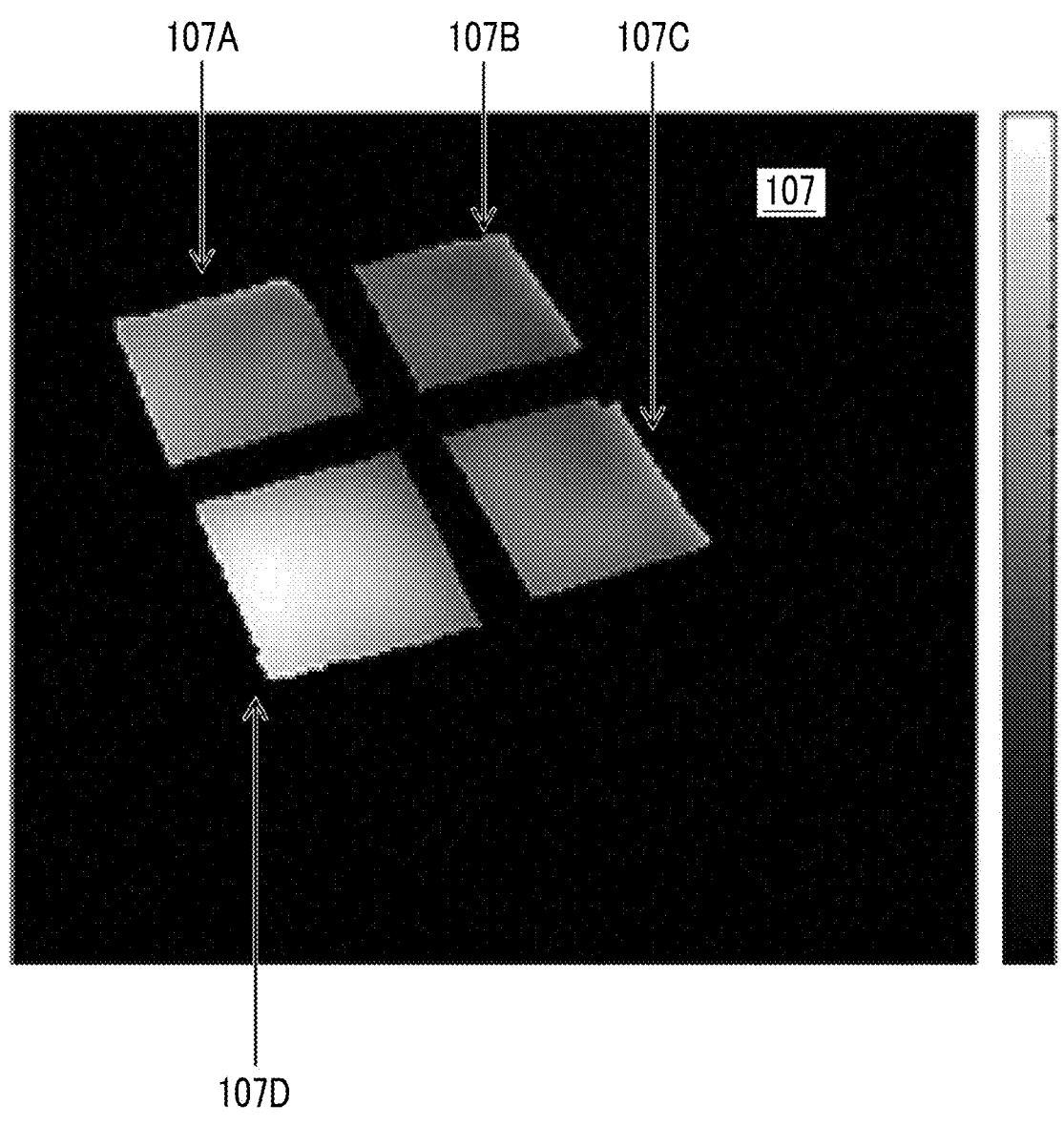
FIG. 13 is a diagram showing a temperature gradient image.

FIG. 13 shows the temperature gradient image 107 derived in the temperature gradient estimation step. As shown in FIG. 13, the temperature gradient image 107 derived in the temperature gradient estimation step includes temperature gradient images 107A, 107B, 107C, and 107D corresponding to the regions Ar(1), Ar(2), Ar(3), and Ar(4) of the respective upper surfaces of the four specimens 41, 42, 43, and 44.

<Temperature Gradient Reduction Step>

The temperature gradient reduction step (step S4) is executed by the temperature gradient reduction unit 57. The temperature gradient reduction unit 57 reduces the influence of the temperature gradient from the infrared thermal image 101, which is the first infrared thermal image. For example, the temperature gradient reduction unit 57 reduces the influence of the temperature gradient from the infrared thermal image 101 based on the temperature gradient image 107.

In a case of reducing the influence of the temperature gradient, the temperature gradient reduction unit 57 can subtract the temperature gradient from the infrared thermal image 101 or divide the infrared thermal image 101 by the temperature gradient.

In a case where the temperature gradient is subtracted from the infrared thermal image 101, a value of each pixel of the temperature gradient image 107 can be subtracted from a value of each pixel of the infrared thermal image 101. Further, in a case where the infrared thermal image 101 is divided by the temperature gradient, the value of each pixel of the infrared thermal image 101 can be divided by the value of each pixel of the temperature gradient image 107. Here, for example, the temperature can be applied as the value of each pixel.

Figure 14:
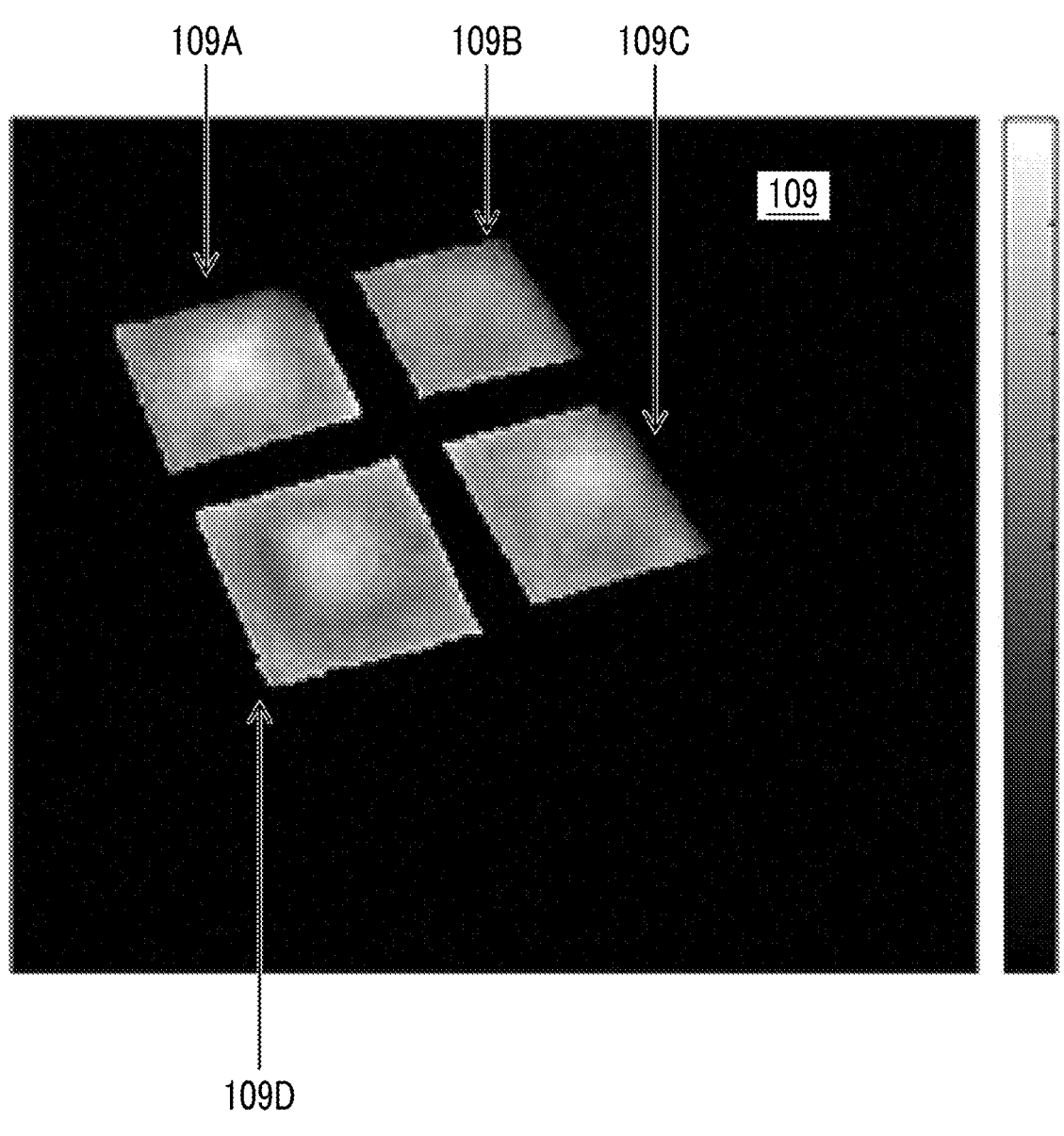
FIG. 14 is a diagram showing a temperature gradient reduction image.

In the temperature gradient reduction step, for example, the temperature gradient reduction unit 57 subtracts the temperature gradient image 107 shown in FIG. 13 from the infrared thermal image 101 shown in FIGS. 6A and 6B to derive a temperature gradient reduction image 109 shown in FIG. 14.

<Information Display Step>

The information display step (step S5) is executed by the information display unit 59. The information display unit 59 displays the temperature gradient reduction image 109 shown in FIG. 14 on the display device 30 (refer to FIG. 1).

As shown in FIG. 14, the temperature gradient reduction image 109 derived in the temperature gradient reduction step includes temperature gradient reduction images 109A, 109B, 109C, and 109D corresponding to the regions Ar(1), Ar(2), Ar(3), and Ar(4) of the respective upper surfaces of the four specimens 41, 42, 43, and 44.

In the temperature gradient reduction image 109A, a high temperature portion due to a floating at a depth of 2 cm is visualized. In the temperature gradient reduction image 109C, a high temperature portion due to a floating at a depth of 3 cm is visualized. It can be understood that the influence of the temperature gradient is reduced in the temperature gradient reduction image 109.

Figure 15:
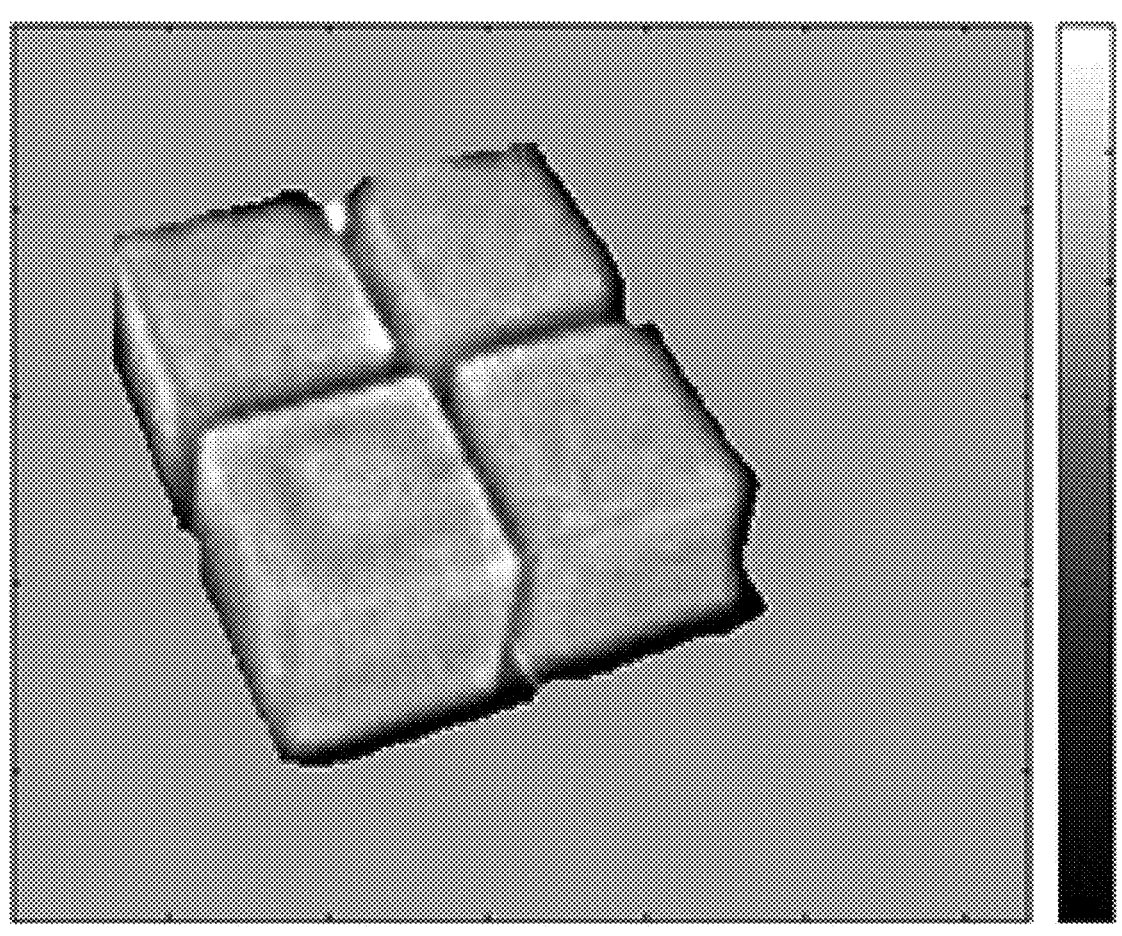
FIG. 15 is a diagram showing a temperature gradient reduction image in the related art.

FIG. 15 shows an image in which the temperature gradient is reduced by applying the related art to the infrared thermal image 101 of the specimen group 40. As shown in FIG. 15, in the related art, the infrared thermal image is smoothed and the difference is taken without distinguishing the respective surfaces having different average temperatures and temperature gradients of the specimen. Thus, the boundary between the respective surfaces is erroneously detected. Further, it can be understood that the high temperature portions due to the floating at the depth of 2 cm and the floating at the depth of 3 cm cannot be visualized even in a case where the temperature gradient is reduced. Furthermore, the surfaces of the four specimens 41, 42, 43, and 44 of the specimen group 40 are discontinuous, but are continuously adjacent to each other in the infrared thermal image 101. Thus, in the related art, it can be also seen that the infrared thermal image is smoothed and the difference is taken without distinguishing the respective surfaces and thus the boundary between the respective surfaces is erroneously detected.

Next, another preferred embodiment will be described.

In the above region acquisition step (step S2), the case has been described in which the region information is acquired based on the visible image 103 and the infrared thermal image 101.

In the region acquisition unit 53, any data from which the region information can be acquired may be used to acquire the region information. As the data, data acquired by measuring the structure, data created for the structure, and the like can be applied.

For example, as the data acquired by measuring the structure, data obtained by measuring a distance by light detection and ranging (LIDAR) or the like can be used to acquire the region information that distinguishes the surfaces having different inclinations and/or the discontinuous surfaces. The LIDAR emits laser light to each point on the structure surface and measures a time until the laser light is reflected and returned to measure a distance to each point on the structure surface. The region acquisition unit 53 can acquire the region information based on the data obtained by measuring the distance to each point on the structure surface. A method of measuring the distance is not limited to the LIDAR. For example, the distance may be measured by a time of flight (TOF) camera, a stereo camera, or the like. Based on the data obtained by measuring the distance to each point on the structure surface, it is possible to acquire the region information that distinguishes the respective surfaces having different inclinations and/or the respective discontinuous surfaces on the structure surface. Further, a relationship between a coordinate system for the distance measurement and a coordinate system for the infrared camera 32 is known, and thus it is possible to specify a region corresponding to each surface of the structure surface in the infrared thermal image.

Further, as the data created for the structure, drawing data of the structure to be inspected can be used to acquire the region information. The drawing data includes a drawing and computer-aided design (CAD) data. With specification of a position and imaging direction (posture) of the infrared camera 32 by a separate method, the region acquisition unit 53 can specify the regions of the respective surfaces having different inclinations and/or the respective discontinuous surfaces of the structure in an infrared thermal image captured from the above position toward the above direction, based on the drawing data of the structure. Various parameters of the infrared camera 32 are known.

Wi-Fi positioning, sound wave positioning, or the like can be applied to specify the position of the infrared camera 32. Further, a known method such as a gyro sensor can be applied to specify the imaging direction. With application of simultaneous localization and mapping (SLAM), which is a self-position estimation technique based on various sensor measurements, it is also possible to specify the position and imaging direction (posture) of the infrared camera 32 with respect to the structure to be inspected.

Further, in the above region acquisition step (step S2), the case has been described in which the visible image 103 has the color information (RGB signal value), that is, the visible image 103 is configured of three types of images (RGB images). However, the type of the visible image may be one type, two types, or four or more types. The region information can be acquired based on the visible image 103 configured of any type of images and the infrared thermal image 101.

Further, in the above region acquisition step (step S2), the case has been described in which the region information is acquired based on the visible image 103 and the infrared thermal image 101 as the information related to the structure. However, the region information may be directly acquired without using the information related to the structure. For example, the region information corresponding to the first infrared thermal image may be stored in the storage unit 16, the information acquisition unit 51 may firstly acquire the region information from the storage unit 16, and then the region acquisition unit 53 may receive the region information as it is. Alternatively, in a case where the region information is not stored in the storage unit 16, the region acquisition unit 53 may acquire the region information from the outside. For example, the information acquisition unit 51 may first acquire the region information through the network via the input/output interface 12, and then the region acquisition unit 53 may receive the region information as it is.

In the above region acquisition step (step S2), as described above, at least one of the surfaces having different inclinations or the discontinuous surfaces on the structure surface is regarded as different regions and distinguished from each other. Further, on the structure surface, the respective regions where any one of color, roughness, unevenness, presence or absence of solar radiation, thermal conductivity, and infrared emissivity is different are regarded as different regions and distinguished from each other. Each discontinuous surface includes, for example, a shadow surface, each surface separated by a step, a dent, a break, another member, or the like.

In the temperature gradient estimation step (step S3) described above, only the infrared thermal image of the region Ar(i) is used in a case where the temperature gradient of the region Ar(i) is estimated. In FIG. 9, "0" is applied to the coefficient of the smoothing filter in the range exceeding the boundary of the region Ar(i). In FIG. 10, the smoothing filter is extended along the boundary within the range of the region Ar(i).

However, the infrared thermal image used in a case where the temperature gradient of the region Ar(i) is estimated does not have to be strictly limited to only the infrared thermal image of the region Ar(i). Unless the difference in the temperature distribution between the region Ar(i) and a region adjacent to each other across the boundary is large in the vicinity of the boundary of the regions Ar(i), even in a case where the temperature gradient of the region Ar(i) is estimated by including some pixels (adjacent pixels) of an adjacent region exceeding the boundary, noise of the temperature gradient can be reduced with little influence on the estimated temperature gradient of the region Ar(i).

For example, it is preferable to smooth the infrared thermal image to reduce the noise in the infrared thermal image before the infrared thermal image near the boundary of the region Ar(1) of FIG. 11C is extracted. However, in this case, some pixels of the adjacent region exceeding the boundary of the region Ar(1) may be included. In short, the infrared thermal image of the region Ar(i) may be preferentially applied to estimate the temperature gradient of the region Ar(i). The preferential application of the infrared thermal image of the region Ar(i) means that the infrared thermal image of the region Ar(i) is applied more than the infrared thermal image of another region and/or the infrared thermal of the region Ar(i) is applied with a larger weight than the infrared thermal image of another region.

As described above, the estimated temperature gradient information may be any form of information as long as the influence of the temperature gradient can be reduced from the first infrared thermal image in the subsequent temperature gradient reduction step. Further, a method of estimating the temperature gradient is not limited to the smoothing or interpolation of the second infrared thermal image, but a method may be employed in which a mathematical model for expressing the temperature gradient is determined in advance and a parameter of the model is optimized such that the temperature gradient expressed by the model matches the second infrared thermal image. The temperature gradient may be estimated by a method in which a function representing the temperature gradient is determined in advance and a parameter of the function is optimized such that the function best matches the second infrared thermal image, as a simple method thereof.

Alternatively, the temperature gradient may be estimated by a method in which a thermal simulation (simulation of thermal conduction, radiation, and convection) is performed based on the region information and a parameter of the simulation is optimized such that the temperature gradient derived by the simulation best matches the second infrared thermal image. In a case of this method, first, the region information is acquired based on the information related to the structure such as the visible image, the infrared thermal image, the data obtained by measuring the distance to the structure by LIDAR or the like, and the drawing data. Next, under the setting of the region information, various parameters for the thermal simulation are changed and set in various ways, and the thermal simulation is performed. The temperature gradient in each region is reproduced by the thermal simulation (simulation of thermal conduction inside structure, radiation or convection heat transfer on structure surface, solar radiation heating, and the like by finite element method (FEM), finite-difference time-domain method (FDTD), or the like). The temperature gradient in each region reproduced by the thermal simulation may be compared with the temperature change in each region in the second infrared thermal image to employ a temperature gradient that best matches the temperature change. Here, in a case where the temperature gradient by the simulation is compared with the temperature change of the second infrared thermal image, the temperature gradient by the simulation may be scaled such that an average value of temperatures of the second infrared thermal image matches the simulation.

The various parameters to be optimized differ depending on the type of region to be distinguished. For example, in a case where the regions having different colors, roughness, and unevenness are distinguished, the thermal conductivity or emissivity of each region is used as the parameter. In a case where the portions exposed and not exposed to the solar radiation or light other than the solar radiation (for example, reflected and/or radiated light from the periphery of the structure) are distinguished, the amount of heat received by the solar radiation or the light other than the solar radiation in each region is used as the parameter. Even in a case of a uniform surface, in a case where respective regions divided by a step, a dent, a break, or the like in a part of the uniform surface are distinguished, a geometric shape such as a height, a depth, or a width of the step, the dent, or the break, a heat flow rate at a break portion, or the like is used as the parameter.

A content of the region information also differs depending on the type of region to be set. For example, in a case where regions having different colors, roughness, and unevenness are set as different regions, two-dimensional region information (size, shape, position) on the structure surface may be set as the region information for each region. In a case where a plurality of surfaces having different inclinations or discontinuous surfaces are set as different regions, it is necessary to set a three-dimensional structure including the plurality of surfaces as the region information. In a case where each region divided by a step, a dent, a break, or the like is set and a three-dimensional structure thereof can be acquired as the region information, the three-dimensional structure is set (optimized) as the region information (not as parameter to be optimized). In a case where the visible image or the infrared thermal image is used as the information related to the structure, it is possible to derive the three-dimensional structure of the structure surface from the image, but it may be difficult to derive a three-dimensional structure of a small step, dent, break, or the like. On the other hand, in a case where the data obtained by measuring the distance with LIDAR or the like or the drawing data is used as the information related to the structure, it is possible to acquire three-dimensional structure information including a small step, dent, break, or the like.

It is preferable that the region information is set in as wide a range as possible such that the temperature gradient of each region of the structure surface corresponding to at least the second infrared thermal image is reproduced. In a case where the drawing data is used as the information related to the structure, it is possible to set a structure of the entire structure to be inspected as the region information.

In performing the thermal simulation, it is desirable that parameters that can be measured and specified by a separate method, such as the thermal conductivity and emissivity of the structure itself, an outside temperature, and the orientation or heating amount of the solar radiation, are measured and specified to be set as fixed parameters. For example, a day on which the structure to be inspected is captured and an outside temperature on a day before the image can be measured at predetermined time intervals (for example, one hour interval) to be input to the simulation as the fixed parameters. Further, the thermal conductivity and emissivity of general concrete can be set as the thermal conductivity and emissivity of the structure itself.

In order to perform the thermal simulation, the region information naturally needs to be information that correctly reflects the size, shape, and position of each region on the structure surface. In a case where the plurality of surfaces having different inclinations or discontinuous surfaces are set as different regions, the region information needs to be information that correctly reflects the three-dimensional structure thereof. (However, in order to perform the simulation, it is not always necessary to accurately know the size, shape, position, and three-dimensional structure of each region, as long as a relative relationship thereof matches an actual relationship). That is, the thermal simulation is performed under a condition that a size, shape, position, and three-dimensional structure of each actual region on the structure surface to be inspected are correctly reflected to derive the temperature gradient, and in a case where the comparison with the second infrared thermal image is performed, each region on the structure surface is made in correspondence with each region in the second infrared thermal image for the comparison. In a case where the influence of the temperature gradient is reduced from the first infrared thermal image, each region on the structure surface is similarly made in correspondence with each region in the first infrared thermal image for the reduction. That is, the region information acquired based on the information related to the structure is information that correctly reflects the size, shape, position, and the three-dimensional structure of each region on the structure surface and is also information about each region in the first infrared thermal image and the second infrared thermal image corresponding to each region on the structure surface. Therefore, each region on the structure surface needs to be in correspondence with each region in the first infrared thermal image and the second infrared thermal image. In a case where the region information is acquired based on the data obtained by measuring the distance to the structure, the correspondence can be made as described above. In a case where the region information is acquired based on the drawing data, the correspondence can be made by specifying the position and imaging direction of the infrared camera 32 by a separate method, as described above. In a case where the region information is acquired based on the visible image and the infrared thermal image (assuming that there is no positional deviation between the visible image and the infrared thermal image), the correspondence can be made since a distance from the visible camera 34, which captures two or more visible images taken from different viewpoints, to each point on the structure surface can be measured from each visible image by a principle of triangulation measurement, for example. The two or more visible images of different viewpoints can be acquired by performing the capturing with two or more visible cameras 34 of different viewpoints or by capturing the same portion on the structure surface from different viewpoints by using one visible camera 34. However, in a case where one visible camera 34 is used, it is necessary to specify the imaging position and the imaging direction from each viewpoint by a separate method. Alternatively, even in a case where one visible camera is used, with application of a structure from motion (SfM) technique, it is possible to estimate the imaging position and the imaging direction from each viewpoint based on only the captured image from each viewpoint and to estimate the distance to each point on the structure surface from each viewpoint. Thus, the correspondence can be made. Alternatively, with specification of an actual size and shape of the entire structure surface by a separate method, for example, drawing data or separate measurement, the correspondence can be made based on the size and shape of the entire structure surface in the visible image. That is, with the comparison of the actual size or shape of the entire structure surface with the size or shape in the visible image, it is possible to specify the distance from the visible camera 34, which captures the visible image, to each point on the structure surface. Thus, the correspondence can be made. Similarly, with specification of actual sizes and shapes of a plurality of characteristic portions on the structure surface by a separate method, the correspondence can also be made. Alternatively, with the visible camera 34 fixed at a specific position with respect to the structure surface, for example, at a position facing the structure surface for imaging, the correspondence can also be made.

Figure 16A:
FIGS. 16A to 16C are diagrams for describing a method of estimating a temperature gradient by performing thermal simulation based on region information.
Figure 16B:
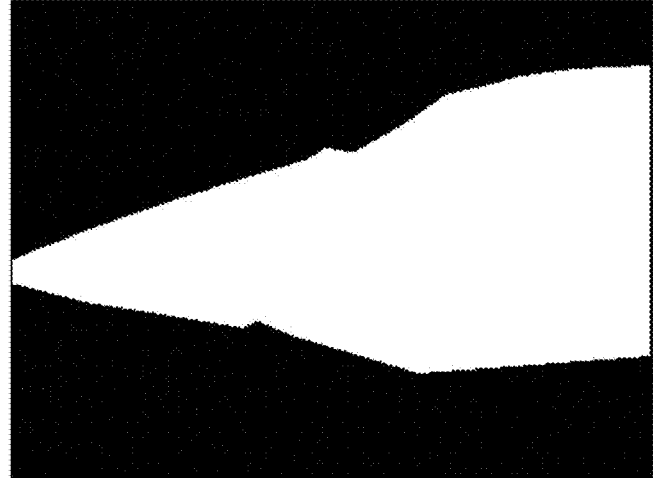
Figure 16C:
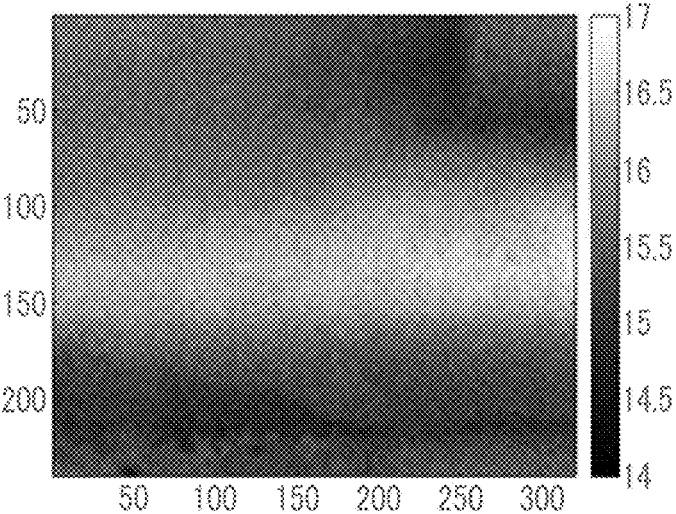

The above method of estimating the temperature gradient by performing the thermal simulation based on the region information is effective in a case where the damaged part is large and straddles a plurality of regions. FIGS. 16A to 16C show an example in which the damaged part largely straddles two regions. FIG. 16A shows a visible image, and FIG. 16B shows the damaged part in the visible image in white with a black background. Further, FIG. 16C shows the infrared thermal image. It can be seen that the damaged part is large and straddles the two regions of an upper surface and a side surface of the structure surface.

Next, a modification example of the acquisition of the first infrared thermal image, the second infrared thermal image, and the information related to the structure on which the region information is based, which are different from the above, (also referred to as acquisition information group) will be described. The information related to the structure on which the region information is based includes the first infrared thermal image, the second infrared thermal image, the visible image, the measurement data, and the like.

A first modification example of the information acquisition is a case where different infrared thermal images are used as the first infrared thermal image and the second infrared thermal image. Such a modification example of the information acquisition is required, for example, in a case where an infrared camera is mounted on a moving body such as a drone and captures an image in close proximity to the structure surface. The case where the infrared camera mounted on the moving object is used to capture an image in close proximity to the structure surface includes a case where the structure surface within an imaging range is uniform, while a temperature gradient is generated, and a boundary with another region serving as a starting point of the temperature gradient is present outside the imaging range.

Here, the fact that the structure surface is uniform means that a surface inclination is constant and a discontinuous surface is not included. The fact that a discontinuous surface is not included means that a discontinuous surface due to a shadow, a step, a dent, a break, another member, or the like is not included. It also means that a color, roughness, unevenness, presence or absence of solar radiation, thermal conductivity, or infrared emissivity of the surface is constant.

In this case, the structure is captured from a distance with the infrared camera to acquire the second infrared thermal image. The structure is similarly captured from a distance with the visible camera to acquire the region information from the visible image. Alternatively, the region information can be acquired from the data measured by LIDAR or the like, instead of the visible camera. The temperature gradient of each region is estimated from these pieces of region information and the second infrared thermal image.

Each region whose temperature gradient is estimated is closely captured by the infrared camera to acquire the first infrared thermal image. With extraction of a closely captured range (range where the first infrared thermal image is captured) in a range whose temperature gradient is estimated, it is possible to reduce the influence of the extracted temperature gradient from the first infrared thermal image.

The temperature gradient is a global temperature change as compared with the temperature distribution due to the damaged part, and thus it is also possible to estimate the temperature gradient based on the second infrared thermal image captured from a distance as described above.

A second modification example of the information acquisition is a case where a plurality of infrared thermal images and a plurality of visible images are integrated. In the second modification example, a plurality of closely captured visible images are integrated until a boundary of at least one region is included to acquire the region information. The temperature gradient of at least one region is estimated based on the region information from an infrared thermal image obtained by integrating the plurality of infrared thermal images. The temperature gradient is reduced from the integrated infrared thermal image. In the second modification example, the first infrared thermal image and the second infrared thermal image are the same infrared thermal image. It is also possible to acquire the region information from the data measured by LIDAR or the like, instead of the visible image.

A third modification example of the information acquisition is a case where a plurality of infrared thermal images are integrated and a plurality of visible images are not integrated. The region information is acquired based on the visible image captured by the visible camera from a distance. Each region is closely captured by the infrared camera, and the plurality of infrared thermal images are integrated until a boundary is included. The temperature gradient is estimated from the integrated infrared thermal image and the region information. The temperature gradient is reduced from the integrated infrared thermal image. In the third modification example, the first infrared thermal image and the second infrared thermal image are the same infrared thermal image. It is also possible to acquire the region information from the data measured by LIDAR or the like, instead of the visible image.

As described above, it is possible to acquire the region information and/or estimate the temperature gradient by using the different first infrared thermal image, second infrared thermal image, and region information related to the structure on which the region information is based and the plurality of first infrared thermal images, second infrared thermal images, and pieces of region information related to the structure on which the region information is based.

In a case of these methods, it is necessary to specify, by a separate method, the position and imaging direction (posture) of the imaging system with respect to the structure to be inspected at the time of imaging in each method. A known method using various sensors (acceleration sensor, gyro sensor, and the like) or a SLAM technique, which is a self-position estimation technique, can be applied for the specification.

All of the first infrared thermal image, the second infrared thermal image, and the information related to the structure, which are used in the first infrared image acquisition step, the region acquisition step, and the temperature gradient estimation step, do not necessarily have to be captured images or measured pieces of data at the same timing. Captured images (first infrared thermal image, second infrared thermal image, and visible image) or measured pieces of data (data measured by LIDAR or the like) at different timings in each step may be used, or captured images or measured pieces of data at a plurality of timings may be integrated to be used. However, in any of the forms, it is necessary to estimate the temperature gradient in the first infrared thermal image and use the second infrared thermal image captured at an appropriate timing in order to reduce the influence of the temperature gradient. As described above, in a case where the surface of the structure has the plurality of surfaces having different inclinations or discontinuities, the plurality of regions of different colors, roughness, unevenness, thermal conductivity, or emissivity, the regions exposed and not exposed to the solar radiation or light other than the solar radiation (including infrared light), and the like, the differences in the average temperature and the temperature gradient in each region may occur. Accordingly, a problem that the temperature gradient cannot be reduced correctly or a problem of erroneous detection may occur. In order to solve the above problem, the present invention estimates the temperature gradient by distinguishing each region to reduce the influence of the temperature gradient. Here, the differences in the average temperature and the temperature gradient in each region may occur regardless of day and night, but change depending on a time period (timing). Therefore, it is necessary to use the second infrared thermal image captured at an appropriate timing such that the average temperature and the temperature gradient in each region are close to each other between the first infrared thermal image and the second infrared thermal image. With the use of an image captured at a certain timing of daytime solar radiation as the second infrared thermal image, it is possible to estimate the temperature gradient due to the daytime solar radiation.

In a case where a visible image is captured at night using the visible image as the information related to the structure, it is necessary to ensure an amount of visible light required for the imaging by a method of illuminating the structure to be inspected with visible light, a method of using a flash function of a visible camera, or the like.

Next, a preferred embodiment in the information display step (step S5) will be described. As described above, the information display unit 59 displays the temperature gradient reduction image and/or the temperature gradient reduction image subjected to the image processing on the display device 30.

The information display unit 59 can independently display the temperature gradient reduction image derived by the temperature gradient reduction unit 57. The captured images (first infrared thermal image, second infrared thermal image, and visible image) applied in a case where the temperature gradient reduction image is derived can be displayed together with the temperature gradient reduction image in a form such as juxtaposition, superimposition, or embedding.

The temperature gradient reduction image can also be processed (subjected to image processing). In a case of daytime imaging, only a pixel whose value is equal to or larger than a predetermined threshold value in the temperature gradient reduction image can be regarded as the damaged part and displayed. In a case of imaging at night, only a pixel whose value is equal to or less than the predetermined threshold value in the temperature gradient reduction image can be regarded as the damaged part and displayed.

It is also possible to binarize with the predetermined threshold value. A pixel group equal to or larger than the threshold value in a case of daytime imaging and a pixel group equal to or less than the threshold value in a case of imaging at night can be regarded as the damaged part and displayed. With setting of a multi-step threshold value, the temperature gradient reduction image may be processed such that the temperature distribution (temperature difference) of the damaged part can be known to some extent with ternarization, quaternization, or the like and displayed. Further, the temperature gradient reduction image may be processed such that a damage level can be known from the temperature distribution. The processing (image processing) of the temperature gradient reduction image is executed by the CPU 20.

The temperature gradient reduction image can be stored in the storage unit 16 or the like and accumulated. With the storing and accumulation of the temperature gradient reduction image, it is possible to investigate a change with time. Further, in a case of daytime imaging, it is possible to acquire, display, and store a quantitative value of damage, such as a total value of values equal to or larger than a predetermined threshold value, from the temperature gradient reduction image. In a case of imaging at night, it is possible to acquire, display, and store a quantitative value of damage, such as a total value of values equal to or less than the predetermined threshold value.

In the infrared thermal image analysis device of the above embodiment, a necessary captured image or measurement data can be acquired by a separate device. Further, the infrared thermal image analysis device may be incorporated into a device (infrared camera, visible camera, or the like) for capturing a captured image.

The program of the above embodiment may be implemented by a dedicated analysis program, and a device to be implemented may not be limited. For example, the program can also be implemented by a personal computer. Further, the device or program that implements each step may be integrated or separated.

As described above, in the present embodiment, the region information that distinguishes the region of the structure surface to be inspected is acquired, the temperature gradient is estimated based on the region information and the infrared thermal image to reduce the influence of the temperature gradient from the infrared thermal image. Accordingly, it is possible to accurately reduce the influence of the temperature gradient of each region in the infrared thermal image of the structure surface consisting of the plurality of regions where the average temperature and the temperature gradient are different and thus improve the accuracy of discriminating between the damaged part and the sound part.

<Others>

In the above description, a form has been described in which the information acquisition unit 51 acquires the information stored in the storage unit 16, but the present invention is not limited thereto. For example, in a case where necessary information is not stored in the storage unit 16, the information acquisition unit 51 may acquire the information from the outside via the input/output interface 12. Specifically, the information acquisition unit 51 acquires the information input from the outside of the infrared thermal image analysis device 10 via the input/output interface 12.

In the above embodiment, a hardware structure of a processing unit that executes various types of processing is the following various processors. The various processors include a central processing unit (CPU) which is a general-purpose processor that executes software (program) to function as various processing units, a programmable logic device (PLD) which is a processor whose circuit configuration can be changed after manufacturing such as a field programmable gate array (FPGA), a dedicated electric circuit which is a processor having a circuit configuration specifically designed to execute specific processing such as an application specific integrated circuit (ASIC), and the like.

One processing unit may be configured of one of these various processors or may be configured of two or more processors of the same type or different types (for example, a plurality of FPGAs or a combination of CPU and FPGA). Further, a plurality of processing units can be configured by one processor. As an example of configuring the plurality of processing units by one processor, first, there is a form in which one processor is configured of a combination of one or more CPUs and software, as represented by a computer such as a client or a server, and the one processor functions as the plurality of processing units. Second, there is a form in which a processor that realizes the functions of the entire system including the plurality of processing units by one integrated circuit (IC) chip is used, as represented by a system on chip (SoC) or the like. As described above, the various processing units are configured by using one or more various processors as a hardware structure.

Further, as the hardware structure of the various processors, more specifically, an electric circuit (circuitry) in which circuit elements such as semiconductor elements are combined may be used.

Each of the above configurations and functions can be realized by any hardware, software, or a combination of both, as appropriate. For example, the present invention can be also applied to a program causing a computer to execute the above processing step (processing procedure), a computer-readable recording medium (non-temporary recording medium) on which such a program is recorded, or a computer on which such a program can be installed.

Although the examples of the present invention have been described above, it is needless to say that the present invention is not limited to the embodiments described above and various modification examples can be made within a range not departing from the spirit of the present invention.

EXPLANATION OF REFERENCES

10: infrared thermal image analysis device
12: input/output interface
16: storage unit
18: operation unit
20: CPU
22: RAM
24: ROM
26: display control unit
30: display device
32: infrared camera
34: visible camera
36: structure
40: specimen group
41: specimen
42: specimen
43: specimen
44: specimen
45: cardboard
51: information acquisition unit
53: region acquisition unit
55: temperature gradient estimation unit
57: temperature gradient reduction unit
59: information display unit
101: infrared thermal image
103: visible image
105: region information
106: infrared thermal image
107: temperature gradient image
107A: temperature gradient image
107B: temperature gradient image
107C: temperature gradient image
109: temperature gradient reduction image
109A: temperature gradient reduction image 109B: temperature gradient reduction image
109C: temperature gradient reduction image
L: distance
La: distance
Px: pixel
S1: step
S2: step
S3: step
S4: step
S5: step

What is claimed is:

1. An infrared thermal image analysis device comprising a processor configured to:

acquire a first infrared thermal image of a structure surface, which is obtained by capturing a structure to be inspected;

consider regions with different inclinations and/or discontinuities as different regions, or consider regions differing in at least one of color, roughness, unevenness, or presence/absence of solar radiation as different regions, on the structure surface where the first infrared thermal image has been captured;

acquire region information that distinguishes each of the regions, for at least one region;

acquire a second infrared thermal image of the structure surface, the second infrared thermal image captured so as to include the at least one region within an imaging range;

estimate a temperature gradient in the at least one region based on the region information for the at least one region and the second infrared thermal image; and reduce an influence of the temperature gradient from the first infrared thermal image.

2. The infrared thermal image analysis device according to claim 1, wherein the processor acquires the region information based on information related to the structure including a visible image obtained by capturing the structure.

3. The infrared thermal image analysis device according to claim 1, wherein the processor acquires the region information based on information related to the structure including at least one of the first infrared thermal image or the second infrared thermal image obtained by capturing the structure.

4. The infrared thermal image analysis device according to claim 1, wherein the processor acquires the region information based on information related to the structure including data obtained by measuring a distance to the structure.

5. The infrared thermal image analysis device according to claim 1, wherein the processor acquires the region information based on information related to the structure including drawing data of the structure.

6. The infrared thermal image analysis device according to claim 1, wherein the processor preferentially applies the second infrared thermal image in the region to the second infrared thermal image in another region to estimate the temperature gradient in the region.

7. The infrared thermal image analysis device according to claim 6, wherein the processor performs, in the preferential application, smoothing processing on the second infrared thermal image with different weights for the region and the other region.

8. The infrared thermal image analysis device according to claim 6, wherein the processor performs, in the preferential application, smoothing processing on the second infrared thermal image with extension along a boundary of the region in a range not including the other region.

9. The infrared thermal image analysis device according to claim 1, wherein the processor preferentially applies the second infrared thermal image in a peripheral region of the region to estimate the temperature gradient in the region.

10. The infrared thermal image analysis device according to claim 9, wherein the peripheral region is in a case where a smallest distance among distances from pixels in the region to each pixel on a boundary of the region is defined as a distance from each of the pixels to the boundary and a distance at a pixel having a largest distance to the boundary is defined as a distance from a center to the boundary, a region including at least a pixel whose distance to the boundary is ½ or less of the distance from the center to the boundary.

11. The infrared thermal image analysis device according to claim 1, wherein the processor estimates the temperature gradient in the region by thermal simulation.

12. The infrared thermal image analysis device according to claim 1, wherein the processor subtracts the temperature gradient from the first infrared thermal image or divides the first infrared thermal image by the temperature gradient in a case where the influence of the temperature gradient is reduced.

13. The infrared thermal image analysis device according to claim 1, wherein at least one of the first infrared thermal image, the second infrared thermal image, or information related to the structure on which the region information is based is acquired at a different timing.

14. The infrared thermal image analysis device according to claim 1, wherein at least one of the first infrared thermal image, the second infrared thermal image, or information related to the structure on which the region information is based is an image or information obtained by integrating a plurality of images or pieces of information.

15. The infrared thermal image analysis device according to claim 1, wherein the processor acquires the first infrared thermal image and the second infrared thermal image at a timing of solar radiation.

16. The infrared thermal image analysis device according to claim 1, wherein the structure surface includes at least one of a plurality of surfaces having different inclinations or discontinuous surfaces.

17. The infrared thermal image analysis device according to claim 1, wherein the processor displays a temperature gradient reduction image in which the influence of the temperature gradient is reduced from the first infrared thermal image on a display device.

18. The infrared thermal image analysis device according to claim 17, wherein the processor displays the temperature gradient reduction image subjected to image processing on the display device.

19. The infrared thermal image analysis device according to claim 1, wherein the first infrared thermal image and the second infrared thermal image are the same infrared thermal image.

20. An infrared thermal image analysis method comprising:

acquiring a first infrared thermal image of a structure surface, which is obtained by capturing a structure to be inspected;

considering regions with different inclinations and/or discontinuities as different regions, or consider regions differing in at least one of color, roughness, unevenness, or presence/absence of solar radiation as different regions, on the structure surface where the first infrared thermal image has been captured;

acquiring region information that distinguishes each of the regions, for at least one region;

acquiring a second infrared thermal image of the structure surface, the second infrared thermal image captured so as to include the at least one region within an imaging range;

estimating a temperature gradient in the at least one region based on the region information for the at least one region and the second infrared thermal image; and reducing an influence of the temperature gradient from the first infrared thermal image.

21. A non-transitory, computer-readable tangible recording medium which records thereon a program for causing, when read by a computer, the computer to execute:

acquiring a first infrared thermal image of a structure surface, which is obtained by capturing a structure to be inspected;

considering regions with different inclinations and/or discontinuities as different regions, or consider regions differing in at least one of color, roughness, unevenness, or presence/absence of solar radiation as different regions, on the structure surface where the first infrared thermal image has been captured;

acquiring region information that distinguishes each of the regions, for at least one region;

acquiring a second infrared thermal image of the structure surface, the second infrared thermal image captured so as to include the at least one region within an imaging range;

estimating a temperature gradient in the at least one region based on the region information for the at least one region and the second infrared thermal image; and reducing an influence of the temperature gradient from the first infrared thermal image.

* * * * *